US012613341B2

(12) United States Patent
Yamao

(10) Patent No.: US 12,613,341 B2
(45) Date of Patent: Apr. 28, 2026

(54) GENERATION METHOD, NON-TRANSITORY COMPUTER-READABLE STORAGE MEDIUM FOR STORING GENERATION PROGRAM, AND INFORMATION PROCESSING APPARATUS

(71) Applicant: FUJITSU LIMITED, Kawasaki (JP)

(72) Inventor: Sosuke Yamao, Atsugi (JP)

(73) Assignee: Fujitsu Limited, Kawasaki (JP)

( * ) Notice: Subject to any disclaimer, the term of this patent is extended or adjusted under 35 U.S.C. 154(b) by 1104 days.

(21) Appl. No.: 17/676,273

(22) Filed: Feb. 21, 2022

(65) Prior Publication Data

US 2022/0179085 A1 Jun. 9, 2022

Related U.S. Application Data

(63) Continuation of application No. PCT/JP2019/039019, filed on Oct. 2, 2019.

(51) Int. Cl.
*G01S 17/89* (2020.01)

(52) U.S. Cl.
CPC .................................... *G01S 17/89* (2013.01)

(58) Field of Classification Search
None
See application file for complete search history.

(56) References Cited

U.S. PATENT DOCUMENTS

| | | | |
|---|---|---|---|
| 5,917,862 A * | 6/1999 | Shimoda | H04L 25/03178 375/230 |
| 12,189,037 B2 * | 1/2025 | Lasang | G01S 17/894 |

(Continued)

FOREIGN PATENT DOCUMENTS

| | | |
|---|---|---|
| JP | 2014-515530 A | 6/2014 |
| JP | 2016-213808 A | 12/2016 |

(Continued)

OTHER PUBLICATIONS

Owens, Jason L. et al., "MSG-Cal: Multi-sensor Graph-based Calibration", 2015 IEEE/RSJ International Conference on Intelligent Robots and Systems (IROS), IEEE, XP032832110, pp. 3660-3667, Sep. 28, 2015 [retrieved on Dec. 11, 2015].

(Continued)

*Primary Examiner* — Lina Cordero
(74) *Attorney, Agent, or Firm* — Fujitsu Intellectual Property Center

(57) ABSTRACT

A computer is configured to: specify the number of times of a time point when the target is detected at the same time point among time points by each set of two sensors among the three or more sensors by using whether the target is detected by each of the three or more sensors at each time point; generate information indicating connectivity regarding estimation accuracy of a relative positional relationship between sensors by using the number of times specified for each set of sensors and a variance of arrangement positions of the targets at the time points; generate information indicating a first relative positional relationship between two sensors having connectivity by using the information indicating connectivity; generates information indicating a second relative positional relationship between two sensors having no connectivity by using the information indicating connectivity and the information indicating the first relative positional relationship; and outputs the generated information.

12 Claims, 29 Drawing Sheets

(56) References Cited

U.S. PATENT DOCUMENTS

| | | | |
|---|---|---|---|
| 2009/0315978 A1* | 12/2009 | Wurmlin | G06T 7/85 |
| | | | 348/E13.001 |
| 2012/0300979 A1 | 11/2012 | Pirchheim et al. | |
| 2013/0004019 A1* | 1/2013 | Ushijima | G06V 10/46 |
| | | | 382/103 |
| 2016/0323559 A1 | 11/2016 | Matsunobu et al. | |
| 2017/0326739 A1* | 11/2017 | Nakazato | B25J 13/081 |
| 2017/0345180 A1* | 11/2017 | Sugiura | G06T 7/70 |
| 2019/0004178 A1* | 1/2019 | Motoyama | G01S 17/87 |
| 2020/0410754 A1* | 12/2020 | Sugano | G06T 3/16 |

FOREIGN PATENT DOCUMENTS

| | | |
|---|---|---|
| JP | 2019-071650 A | 5/2019 |
| JP | 2019-086476 A | 6/2019 |
| JP | 2019-153863 A | 9/2019 |

OTHER PUBLICATIONS

Ruan, Minghao et al., "Calibration of 3D Sensors Using a Spherical Target", 2014 Second International Conference on 3D Vision, IEEE, vol. 30, No. 4,ol. 1, XP032733114, pp. 187-193, Dec. 8, 2014 [retrieved on Feb. 6, 2015].

Korkalo, Otto et al., "Auto-calibration of depth camera networks for people tracking", Machine Vision and Applications, Springer Verlag, DE, vol. 30, No. 4, XP036793609, pp. 671-688, Mar. 28, 2019 [retrieved on Mar. 28, 2019].

Extended European Search Report dated Sep. 30, 2022 for corresponding European Patent Application No. 19947861.1, 8 pages.

Minghao Ruan et al., "Extrinsic Calibration of 3D Sensors Using a Spherical Target", 3DV 2014, 2014 (Total 8 pages).

International Search Report and Written Opinion of the International Searching Authority (Form PCT/ISA/210, 220, and 237), mailed in connection with PCT/JP2019/039019 and mailed Nov. 12, 2019 (Total 8 pages).

* cited by examiner

| SENSOR IDENTIFICATION INFORMATION | TIME POINT t | | | | | |
|---|---|---|---|---|---|---|
| | t=1 | t=2 | ... | t=6 | ... | t=13 |
| SE 10A | POINT CLOUD INFORMATION OF TARGET AT TIME POINT t = 1 OBSERVED BY SENSOR 10A | POINT CLOUD INFORMATION OF TARGET AT TIME POINT t = 2 OBSERVED BY SENSOR 10A | ... | POINT CLOUD INFORMATION OF TARGET AT TIME POINT t = 6 OBSERVED BY SENSOR 10A | ... | NO TARGET |
| SE 10B | NO TARGET | NO TARGET | ... | POINT CLOUD INFORMATION OF TARGET AT TIME POINT t = 6 OBSERVED BY SENSOR 10B | ... | NO TARGET |
| SE 10C | NO TARGET | NO TARGET | ... | POINT CLOUD INFORMATION OF TARGET AT TIME POINT t = 6 OBSERVED BY SENSOR 10C | ... | POINT CLOUD INFORMATION OF TARGET AT TIME POINT t = 13 OBSERVED BY SENSOR 10C |
| SE 10D | NO TARGET | NO TARGET | ... | NO TARGET | ... | NO TARGET |

| SENSOR IDENTIFICATION INFORMATION | EXTERNAL PARAMETER |
|---|---|
| SE10B | $T_{BA}$ |
| SE10C | $T_{CA}$ |
| SE10D | $T_{DA}$ |

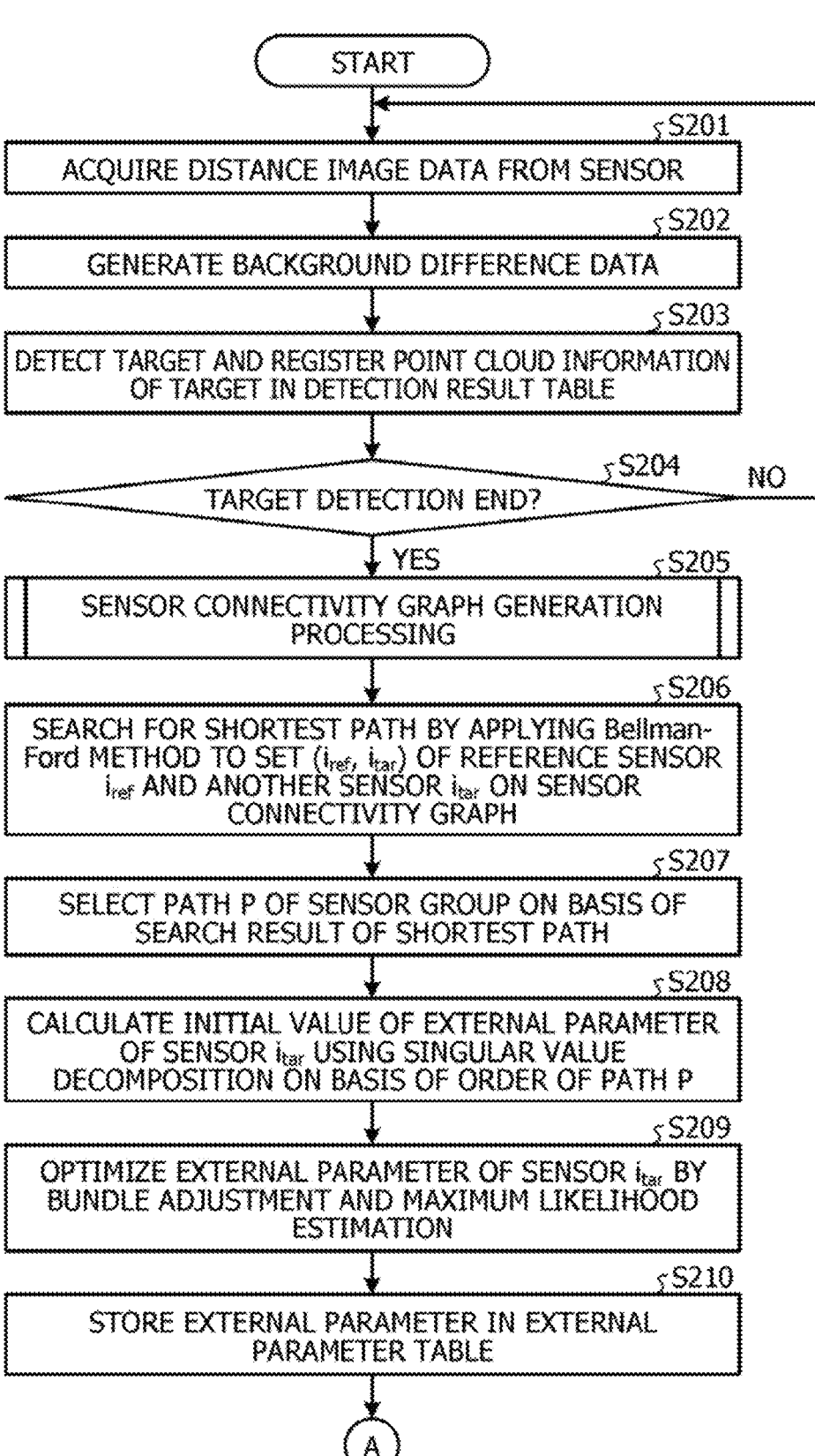

START

S201
ACQUIRE DISTANCE IMAGE DATA FROM SENSOR

S202
GENERATE BACKGROUND DIFFERENCE DATA

S203
DETECT TARGET AND REGISTER POINT CLOUD INFORMATION OF TARGET IN DETECTION RESULT TABLE

S204
TARGET DETECTION END?          NO

YES          S205
SENSOR CONNECTIVITY GRAPH GENERATION PROCESSING

S206
SEARCH FOR SHORTEST PATH BY APPLYING Bellman-Ford METHOD TO SET $(i_{ref}, i_{tar})$ OF REFERENCE SENSOR $i_{ref}$ AND ANOTHER SENSOR $i_{tar}$ ON SENSOR CONNECTIVITY GRAPH

S207
SELECT PATH P OF SENSOR GROUP ON BASIS OF SEARCH RESULT OF SHORTEST PATH

S208
CALCULATE INITIAL VALUE OF EXTERNAL PARAMETER OF SENSOR $i_{tar}$ USING SINGULAR VALUE DECOMPOSITION ON BASIS OF ORDER OF PATH P S209
OPTIMIZE EXTERNAL PARAMETER OF SENSOR $i_{tar}$ BY BUNDLE ADJUSTMENT AND MAXIMUM LIKELIHOOD ESTIMATION

S210
STORE EXTERNAL PARAMETER IN EXTERNAL PARAMETER TABLE

A

FIG. 25
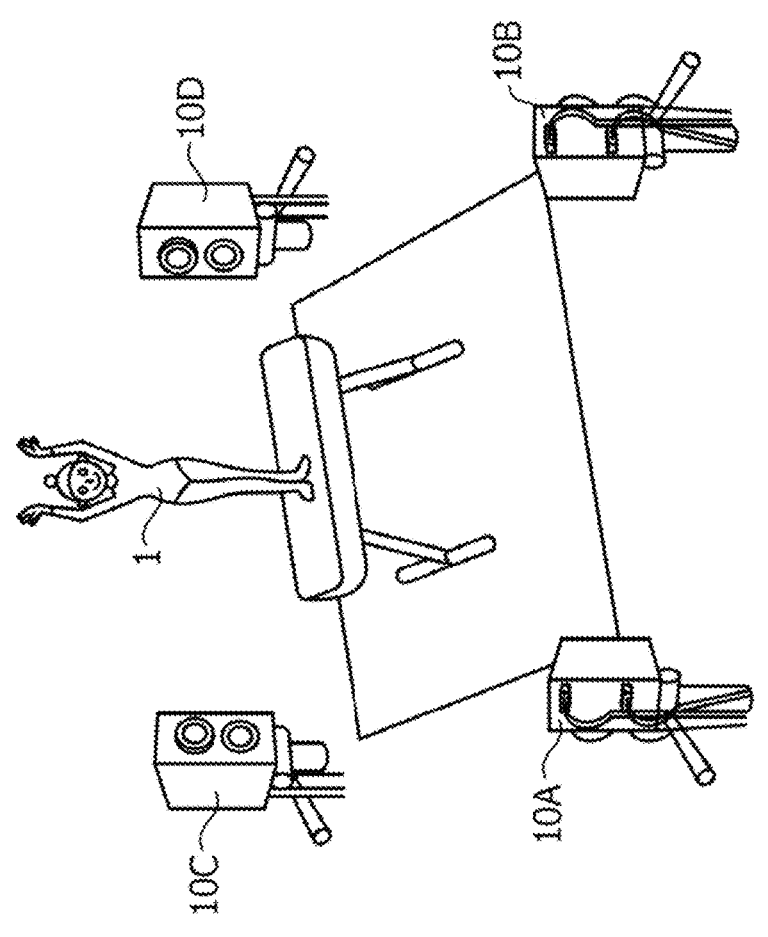
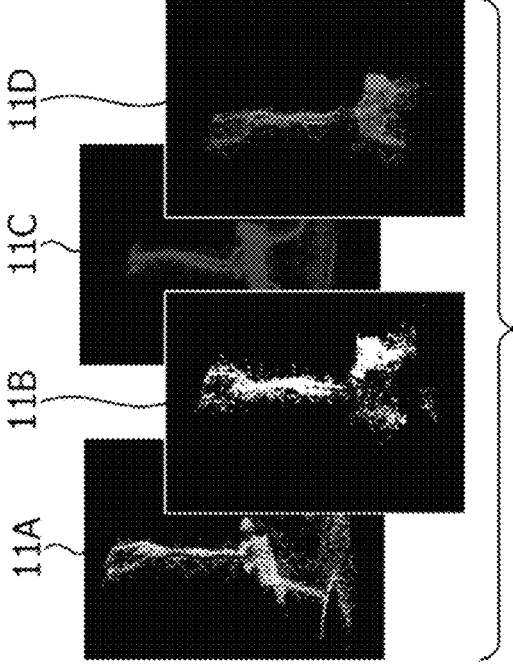
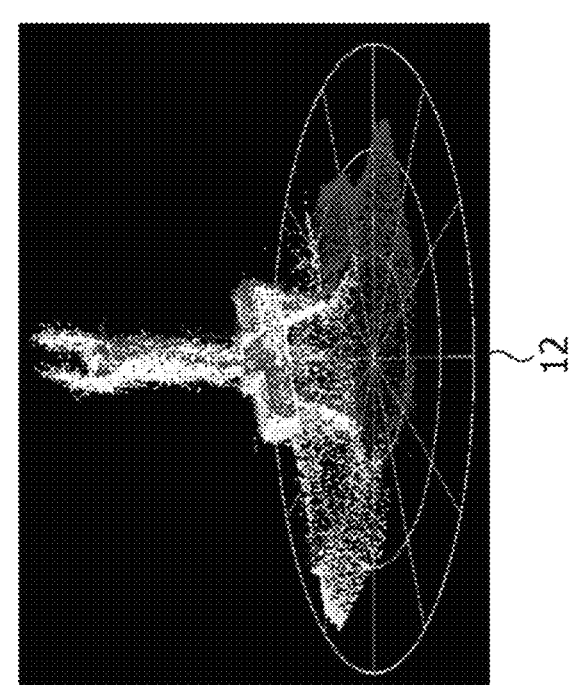

GENERATION METHOD, NON-TRANSITORY COMPUTER-READABLE STORAGE MEDIUM FOR STORING GENERATION PROGRAM, AND INFORMATION PROCESSING APPARATUS

CROSS-REFERENCE TO RELATED APPLICATION

This application is a continuation application of International Application PCT/JP2019/039019 filed on Oct. 2, 2019 and designated the U.S., the entire contents of which are incorporated herein by reference.

FIELD

The embodiment discussed herein is related to a generation method or the like.

BACKGROUND

There is an existing technique for measuring a three-dimensional point cloud of an object, using a distance measuring device such as a laser sensor. In the following description, the distance measuring device such as a laser sensor is referred to as a "sensor". For example, an object is sensed from each direction using a plurality of sensors arranged around the object, and three-dimensional point clouds that are measurement results of the respective sensors are integrated, so that the object can be three-dimensionally reproduced.

FIG. 25 is a diagram illustrating a result of integrating three-dimensional point clouds measured by a plurality of sensors. In the example illustrated in FIG. 25, sensors 10A, 10B, 10C, and 10D are arranged around (front and back of) an object 1, and the sensors 10A to 10D measure the object 1 to obtain three-dimensional point clouds.

A three-dimensional point cloud 11A is data based on the measurement result of the sensor 10A. A three-dimensional point cloud 11B is data based on the measurement result of the sensor 10B. A three-dimensional point cloud 11C is data based on the measurement result of the sensor 10C. A three-dimensional point cloud 11D is data based on the measurement result of the sensor 10D. By integrating the three-dimensional point clouds 11A to 11D, a three-dimensional point cloud 12 is generated. The three-dimensional point cloud 12 three-dimensionally reproduces the object 1.

Here, in the case of integrating a plurality of three-dimensional point clouds, an external parameter is used. The external parameter is information indicating a positional relationship among a plurality of sensors. As an existing technique for calculating an external parameter, for example, there are existing techniques 1 and 2.

The existing technique 1 will be described. The existing technique 1 is an external calibration technique for calculating an external parameter of a sensor using a spherical target. In the existing technique 1, one spherical target is observed by a first sensor and a second sensor a plurality of times while moving the spherical target.

Figure 26:
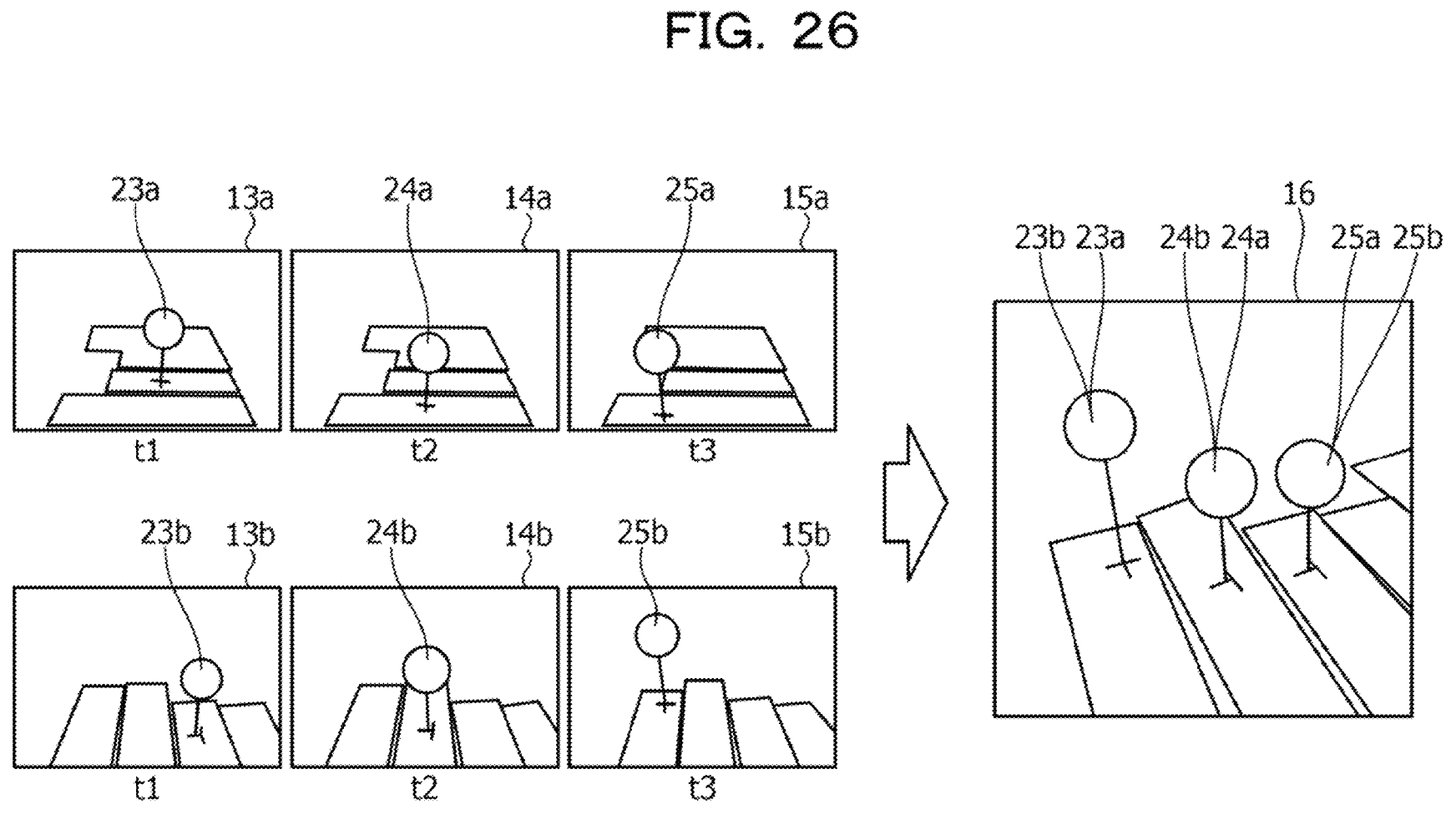

FIG. 26 is a diagram for describing the existing technique 1. In FIG. 26, measurement results 13a, 14a, and 15a are measured by the first sensor at time points t =1, 2, and 3, respectively. Spherical targets 23a, 24a, and 25a are detected from the measurement results 13a, 14a, and 15a, respectively. Description of the measurement results at and after time point t=4 is omitted.

Measurement results 13b, 14b, and 15b are measured by the second sensor at time points t=1, 2, and 3, respectively. Spherical targets 23b, 24b, and 25b are detected from the measurement results 13b, 14b, and 15b, respectively. Description of the measurement results at and after time point t=4 is omitted.

In the existing technique 1, the spherical targets 23a, 24a, and 25a are associated with the spherical targets 23b, 24b, and 25b, and an initial value of the external parameter is estimated on the basis of a positional relationship among the three-dimensional point clouds of the associated spherical targets. For the estimation of the initial value, alignment of singular value decomposition is performed. In the existing technique 1, after the estimation of the initial value, the external parameter between the first sensor and the second sensor is optimized using bundle estimation or maximum likelihood estimation, and the external parameter is calculated.

Image 16 illustrates an external calibration result. By executing the external calibration, the positions of the spherical targets 23a, 24a, and 25a and the spherical targets 23b, 24b, and 25b match.

Note that, in the existing technique 1, the spherical target being able to be detected by the first sensor and the second sensor at the same time at least three time points while changing the position of the spherical target is the condition for calculating the external parameter.

Next, the existing technique 2 will be described. The existing technique 2 is a technique for detecting a target by image processing, and sequentially estimating an external parameter of each camera, using two cameras as starting points and using a direct linear transform (DLT) algorithm.

FIGS. 27 and 28 are diagrams for describing the existing technique 2. FIG. 27 will be described. In the existing technique 2, a target 2 is observed by sensors 10A to 10D while moving the target 2 at time points t=1 to 7.

For example, at time point t=1, the target 2 is observed by the sensors 10A to 10D. At time point t=2, the target 2 is observed by the sensors 10A to 10D. At time point t=3, the target 2 is observed by the sensors 10A to 10D.

At time point t=4, the target 2 is observed by the sensors 10A, 10B, and 10D. At time point t=5, the target 2 is observed by the sensors 10A, 10B, and 10D. At time point t=6, the target 2 is observed by the sensors 10C and 10D. At time point t=7, the target 2 is observed by the sensors 10C and 10D.

As a result, the sensor 10A observes the target 2 at the time points t=1, 2, 3, 4, and 5, and an observation result 20A is obtained. The sensor 10B observes the target 2 at time points t=1, 2, 3, 4, and 5, and an observation result 20B is obtained. The sensor 10C observes the target at time points t=1, 2, 3, 6, and 7, and an observation result 20C is obtained. The sensor 10D observes the target at time points t=1, 2, 3, 4, 5, 6, and 7, and an observation result 20D is obtained.

The description proceeds to FIG. 28. In the existing technique 2, the order of estimating the external parameters is predetermined. For example, in the existing technique 2, the sensors are selected in the order of the sensors 10B, 10C, and 10D with reference to the sensor 10A, and the external parameters are estimated. In the case of estimating the external parameters, the target 2 available for estimation is the target 2 at time point already observed by the reference sensor or a selected sensor.

Therefore, when the sensors are selected in the order of the sensors 10B, 10C, and 10D, the target observed at time points t=1, 2, 3, 4, and 5 can be used for the estimation of the external parameter in the observation result 20B of the sensor 10B. In the observation result 20C of the sensor 10C, the target observed at time point t=1, 2, and 3 can be used for the estimation of the external parameter. In the observation result 20D of the sensor 10D, the target observed at time points t=1 to 7 can be used for estimation of the external parameter.

Examples of the related art include as follows: Japanese Laid-open Patent Publication No. 2019-086476; and M. Ruan, *"Extrinsic Calibration of 3D Sensors Using a Spherical Target,"* 3DV 2014.

SUMMARY

According to an aspect of the embodiments, there is provided a generation method performed by a computer. In an example, the generation method includes: obtaining detection results of a target at a plurality of time points by three or more sensors; specifying a number of times of a time point when the target is detected at a same time point among the plurality of time points by each set of two sensors among the three or more sensors on a basis of whether each of the three or more sensors has detected the target at each time point; generating information that indicates connectivity regarding estimation accuracy of a relative positional relationship between sensors on a basis of the specified number of times for each set of sensors and a variance of arrangement positions of the target at the plurality of time points; generating information that indicates a first relative positional relationship between two sensors that have connectivity on a basis of the information that indicates connectivity; generating information that indicates a second relative positional relationship between two sensors that have no connectivity on a basis of the information that indicates connectivity and the information that indicates a first relative positional relationship; and outputting the information that indicates a first relative positional relationship and the information that indicates a second relative positional relationship as information that indicates a positional relationship among the three or more sensors.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 is a diagram for describing effects of the information processing apparatus according to the present embodiment 1;

FIG. 8 is a table illustrating an example of a data structure of a detection result table;

FIG. 9 is a table illustrating an example of a data structure of an external parameter table;

FIG. 21 is a diagram for describing an arrangement position of a target;

FIGS. 23A and 23B illustrate a flowchart illustrating a processing procedure of the information processing apparatus according to the present embodiment 2;

FIG. 25 is a diagram illustrating a result of integrating three-dimensional point clouds measured by a plurality of sensors;

FIG. 26 is a diagram for describing an existing technique 1;

DESCRIPTION OF EMBODIMENTS

The above-described existing technique 1 is based on the assumption that the external parameters of two sensors are grasped and further the first sensor and the second sensor are required to observe one spherical target at the same time. Therefore, in a case where sensing ranges of the first sensor and the second sensor are not shared, the spherical target is not able to be observed by the two sensors at the same time. Furthermore, even in a case where the shared sensing range is narrow, it is difficult for the two sensors to observe the spherical target a sufficient number of times because it is assumed to capture the spherical target a plurality of times while moving the spherical target. In such a case, conditions for estimating the external parameters of the first sensor and the second sensor are insufficient.

Furthermore, there is a desire to sense the object from various directions in a wider range using three or more sensors. However, the existing technique 1 is based on the assumption that all the sensors observe the target at the same time at each time point. Therefore, in a case where a pair not sharing the sensing range is present among the three or more sensors, the external parameters are not able to be estimated.

Furthermore, in the above-described existing technique 2, the order of estimating the external parameters is predetermined. For example, as described in FIG. 28, when the sensors are selected in the order of the sensors 10B, 10C, and 10D with reference to the sensor 10A and the external parameters are estimated, the targets that can be used to estimate the external parameter decreases in the observation result 20C and the distribution becomes biased. If the targets that can be used to estimate the external parameter are unevenly distributed, the estimation accuracy of the external parameter will become low. The decrease in the estimation accuracy also affects the estimation accuracy in the case of selecting the observation result 20D in the subsequent stage and estimating the external parameter.

In one aspect, an object of the present invention is to provide a generation method, a generation program, and an information processing apparatus capable of accurately generating information indicating relative positional relationships such as an arrangement positional relationship and an angle of view relationship for three or more sensors.

Hereinafter, embodiments of a generation method, a generation program, and an information processing apparatus disclosed in the present application will be described in detail with reference to the drawings. Note that the embodiments are not limited to the present disclosure.

Embodiment 1

Figure 1:
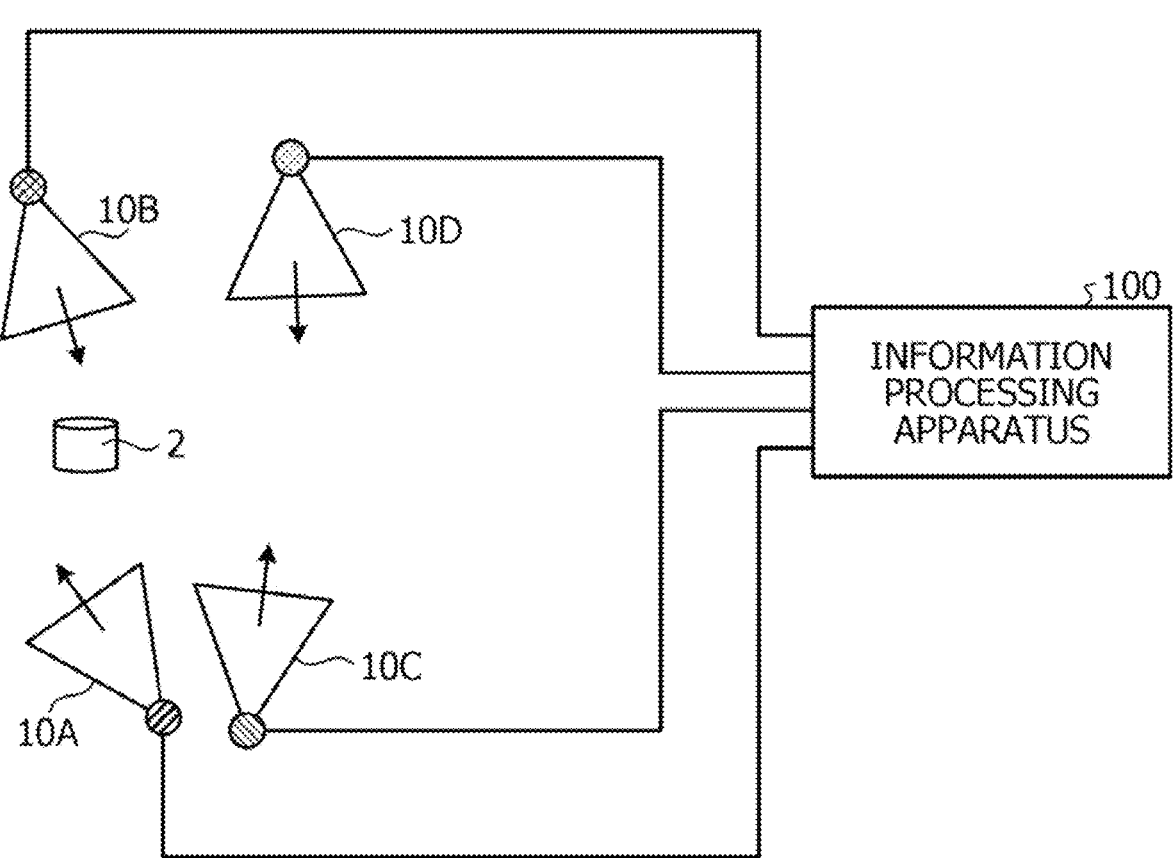
FIG. 1 is a diagram illustrating an example of an information processing system according to a present embodiment 1.

FIG. 1 is a diagram illustrating an example of an information processing system according to a present embodiment 1. As illustrated in FIG. 1, the information processing system according to the present embodiment 1 includes sensors 10A, 10B, 10C, and 10D and an information processing apparatus 100. Each of the sensors 10A to 10D is connected to the information processing apparatus 100 by wired or wireless means. Although FIG. 1 illustrates the sensors 10A to 10D, the information processing system may also include other sensors.

The sensor 10A is a measuring device (laser sensor) that measures a distance between a point cloud constituting an object (or a target 2) and the sensor 10A. The sensor 10A outputs distance image data as a measurement result to the information processing apparatus 100. The distance image data includes information in which each pixel and a distance value are associated with each other. The distance image data is converted into three-dimensional point cloud data by the information processing apparatus 100. The three-dimensional point cloud data is information in which a point and coordinates of a three-dimensional orthogonal coordinate system are associated with each other for the point cloud.

Description of the sensor 10B is similar to the description of the sensor 10A. In the following description, the sensors 10A and 10B are collectively referred to as "sensor(s) 10" as appropriate. Furthermore, the three-dimensional point cloud data is data obtained by converting distance image data measured by the sensor 10, but is appropriately expressed as the three-dimensional point cloud data measured by the sensor 10, and description about converting the distance image data into the three-dimensional point cloud data is omitted.

The information processing system according to the present embodiment 1 is a system that measures the object (not illustrated) using the sensor 10 and evaluates performance performed by the object. As preprocessing, the information processing system executes external calibration using the target 2 and generates external parameters. The information processing system integrates three-dimensional point cloud data measured by the sensors 10 on the basis of the generated external parameters, generates three-dimensional point cloud data of the entire object, and evaluates the performance performed by the object.

Processing in the case where the information processing apparatus 100 of the information processing system generates the external parameters will be described. When generating the external parameters, the information processing apparatus 100 executes processing of generating a sensor connectivity graph, processing of reflecting a variance of targets in the sensor connectivity graph, and processing of specifying the order of selecting sensors.

Figure 2:
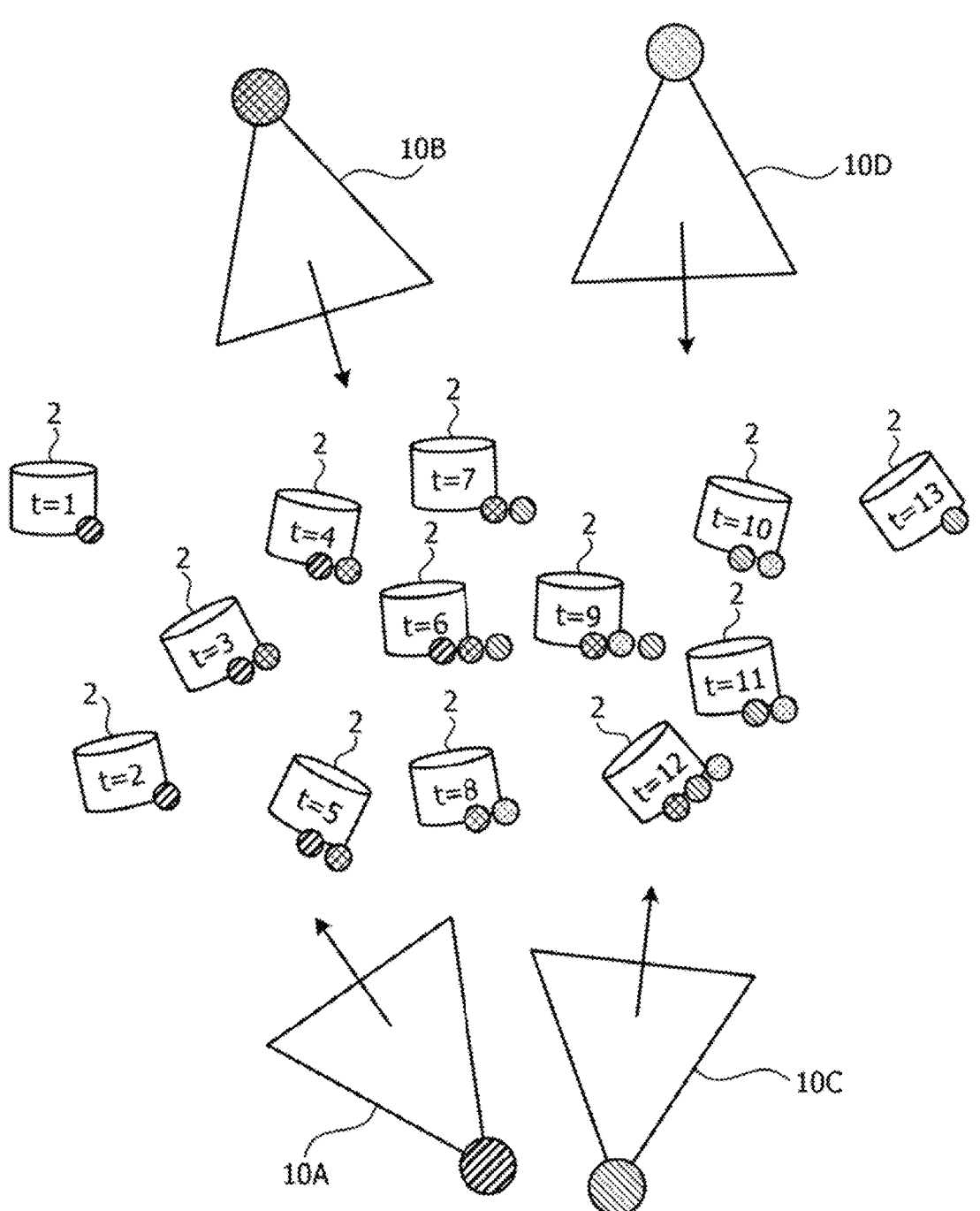
FIG. 2 is a diagram (1) for describing processing of generating a sensor connectivity graph.
Figure 3:
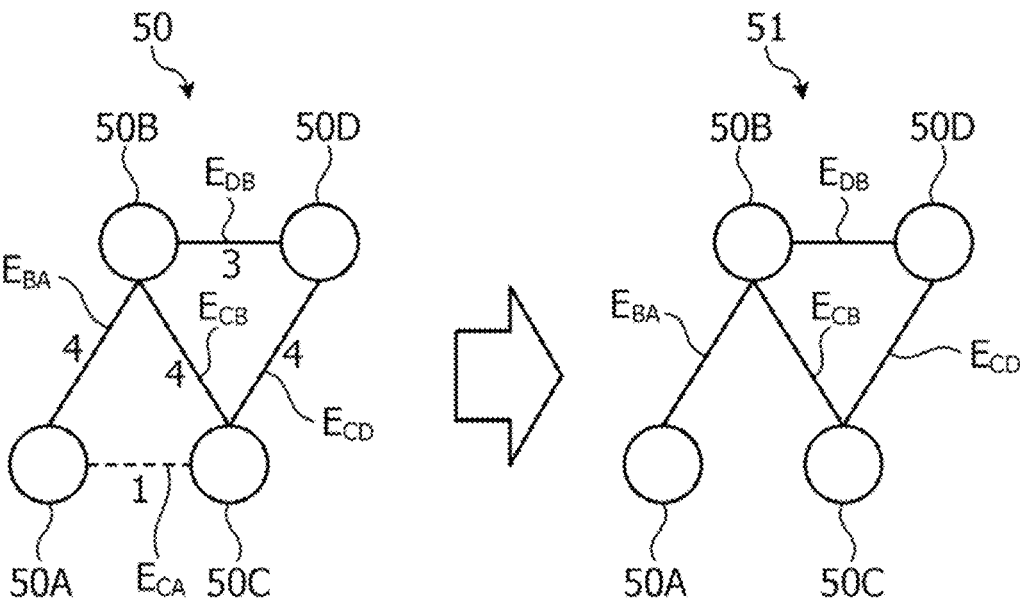
FIG. 3 is a diagram (2) for describing processing of generating a sensor connectivity graph.

FIGS. 2 and 3 are diagrams for describing the processing of generating a sensor connectivity graph. As illustrated in FIG. 2, the target 2 is observed by the sensors 10A to 10D while moving the target 2 at time points t=1 to 13. The target 2 is moved by a user.

For example, at time point t=1, the target 2 is observed by the sensor 10A. At time point t=2, the target 2 is observed by the sensor 10A. At time point t=3, the target 2 is observed by the sensors 10A and 10B. At time point t=4, the target 2 is observed by the sensors 10A and 10B.

At time point t=5, the target 2 is observed by the sensors 10A and 10B. At time point t=6, the target 2 is observed by the sensors 10A, 10B, and 10C. At time point t=7, the target 2 is observed by the sensors 10B and 10C. At time point t=8, the target 2 is observed by the sensors 10B and 10D.

At time point t=9, the target 2 is observed by the sensors 10B, 10C, and 10D. At time point t=10, the target 2 is observed by the sensors 10C and 10D. At time point t=11, the target 2 is observed by the sensors 10C and 10D. At time point t=12, the target 2 is observed by the sensors 10B, 10C, and 10D. At time point t=13, the target 2 is observed by the sensor 10C.

Here, the information processing apparatus 100 specifies the number of times of a time point (hereinafter the share number) when the target 2 is detected at the same time point among the plurality of time points by a set of two sensors among the sensors 10A to 10D.

For the set of sensor 10A and sensor 10B, the target 2 is observed at time points t=3, 4, 5, and 6 among time points t=1 to 13. Therefore, the share number for the set of sensors 10A and 10B is "4".

For the set of sensor 10A and sensor 10C, the target 2 is observed at time point t=6 among time points t=1 to 13. Therefore, the share number for the set of sensors 10A and 10C is "1".

For the set of sensor 10A and sensor 10D, there is no time point among time points t=1 to 13 when the target 2 is observed. Therefore, the share number for the set of sensors 10A and 10D is "0".

For the set of sensor 10B and sensor 10C, the target 2 is observed at time points t=6, 7, and 12 among time points t=1 to 13. Therefore, the share number for the set of sensors 10B and 10C is "3".

For the set of sensor 10B and sensor 10D, the target 2 is observed at time points t=8, 9, and 12 among time points t=1 to 13. Therefore, the share number for the set of sensors 10B and 10D is "3".

For the set of sensor 10C and sensor 10D, the target 2 is observed at time points t=9, 10, 11, and 12 among time points t=1 to 13. Therefore, the share number of the set of sensors 10C and 10D is "4".

The description proceeds to FIG. 3. The information processing apparatus 100 generates a target share number graph 50 on the basis of the share number specified for each set of two sensors. The target share number graph 50 includes nodes 50A, 50B, 50C, and 50D. The node 50A is a node corresponding to the sensor 10A. The node 50B is a node corresponding to the sensor 10B. The node 50C is a node corresponding to the sensor 10C. The node 50D is a node corresponding to the sensor 10D.

In the target share number graph 50, the nodes 50A to 50D are connected by edges E, and each edge E is set with a weight according to the share number. Since the share number for the set of sensors 10A and 10B is "4", the information processing apparatus 100 sets the weight "4" in an edge $E_{BA}$ connecting the node 50A and the node 50B. Since the share number for the set of sensors 10A and 10C is "1", the information processing apparatus 100 sets the weight "1" in an edge $E_{CA}$ connecting the node 50A and the node 50C. Note that since the share number for the set of sensors 10A and 10D is "0", the node 50A and the node 50D are not connected by an edge.

Since the share number for the set of sensors 10B and 10C is "4", the information processing apparatus 100 sets the weight "4" in an edge $E_{BC}$ connecting the node 50B and the node 50C. Since the share number for the set of sensors 10B and 10D is "3", the information processing apparatus 100 sets the weight "3" in an edge $E_{DB}$ connecting the node 50B and the node 50D.

The information processing apparatus 100 generates a sensor connectivity graph 51 by leaving the edges having the weight of "3" or more among the edges E. In the example illustrated in FIG. 3, the information processing apparatus 100 generates the sensor connectivity graph 51 by deleting the edge $E_{CA}$ from the target share number graph 50 and leaving the edges $E_{BA}$, $E_{CB}$, $E_{DB}$, and $E_{CD}$.

Figure 4:
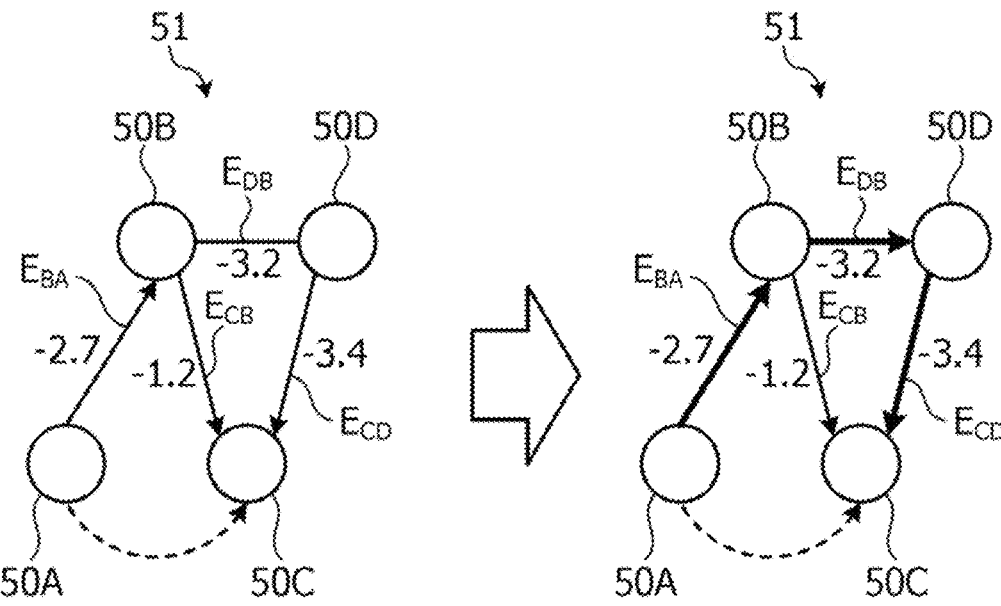
FIG. 4 is a diagram for describing processing of reflecting a variance of a target in the sensor connectivity graph.

FIG. 4 is a diagram for describing processing of reflecting a variance of a target in the sensor connectivity graph. The information processing apparatus 100 calculates a variance$\sigma^2$ of the positions of the target group observed by the set of two sensors at each time points. The information processing apparatus 100 sets "$-2\log\sigma$" as the weight of each edge E, and reflects the variance of the target in the sensor connectivity graph. The smaller the edge weight, the larger the spatial variance of the positions of the target group observed by the set of two sensors (evenly distributed).

For example, as described in FIG. 2, for the set of sensor 10A and sensor 10B, the target 2 is observed at time points t=3, 4, 5, and 6 among time points t=1 to 13. The information processing apparatus 100 calculates a variance $\sigma^2_{BA}$ of the positions of the target 2 at time points t=3, 4, 5, and 6 observed by the sensor 10A (or the sensor 10B). For example, assuming that "$-2\log\sigma_{BA}$" is "$-2.7$", the information processing apparatus 100 sets the weight "$-2.7$" in the edge $E_{BA}$.

For the set of sensor 10B and sensor 10C, the target 2 is observed at time points t=6, 7, and 12 among time points t=1 to 13. The information processing apparatus 100 calculates a variance $\sigma^2_{CB}$ of the positions of the target 2 at time points t=6, 7, and 12 observed by the sensor 10B (or the sensor 10C). For example, assuming that "$-2\log\sigma_{CB}$" is "$-1.2$", the information processing apparatus 100 sets the weight "$-1.2$" in the edge $E_{CB}$.

For the set of sensor 10B and sensor 10D, the target 2 is observed at time points t=8, 9, and 12 among time points t=1 to 13. The information processing apparatus 100 calculates a variance $\sigma^2_{DB}$ of the positions of the target 2 at time points t=8, 9, and 12 observed by the sensor 10B (or the sensor 10D). For example, assuming that "$-2\log\sigma_{DB}$" is "$-3.2$", the information processing apparatus 100 sets the weight "$-3.2$" in the edge $E_{DB}$.

For the set of sensor 10C and sensor 10D, the target 2 is observed at time points t=9, 10, 11, and 12 among time points t=1 to 13. The information processing apparatus 100 calculates a variance $\sigma^2_{CD}$ of the positions of the target 2 at time points t=9, 10, 11, and 12 observed by the sensor 10C (or the sensor 10D). For example, assuming that "$-2\log\sigma_{CD}$" is "$-3.4$", the information processing apparatus 100 sets the weight "$-3.4$" in the edge $E_{CD}$.

The information processing apparatus 100 executes processing of specifying the order of selecting the sensors to be calculated for external parameters on the basis of a result of reflecting the variance of the target 2 in the sensor connectivity graph 51. The information processing apparatus 100 determines a path that minimizes the sum of the edges E by a shortest path search. For example, the information processing apparatus 100 determines the path that minimizes the sum of the edges E, using the Bellman-Ford method or the like.

The path that minimizes the sum of the edges E is the order of the sensors so that the spatial variance of the positions of the target groups becomes as large as possible. In the example illustrated in FIG. 4, assuming that a reference node is the node 50A corresponding to the sensor 10A, the path that minimizes the sum of the edges E is in the order of the node 50A, node 50B, node 50D, and node 50C. For example, the order of the sensors in which the spatial variance of the positions of the target group becomes as large as possible is the sensor 10A, sensor 10B, sensor 10D, and sensor 10C.

The information processing apparatus 100 selects the sensor 10B, the sensor 10D, and the sensor C in this order with reference to the sensor 10A, and estimates the external parameters. Here, by synthesizing the relative positions and orientations of the set of two sensors to be connected, it is possible to calculate the external parameters of the sensor that is not directly connected to the reference sensor.

Figure 5:
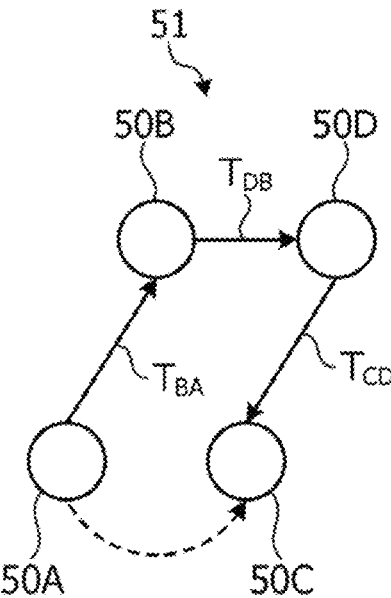
FIG. 5 is a diagram for describing calculation of an external parameter of a sensor that is not directly connected.

FIG. 5 is a diagram for describing calculation of the external parameter of the sensor that is not directly connected. The node 50A, node 50B, node 50C, and node 50D correspond to the sensor 10A, sensor 10B, sensor 10C, and sensor 10D, respectively. In the sensor connectivity graph 51 described in FIG. 4, the node 50A and the node 50C are not directly connected, but by executing the following processing, the relative positions and orientations of the reference sensor 10A and the sensor 10C can be calculated.

The information processing apparatus 100 selects the set of sensor 10A and sensor 10B, and calculates an external parameter $T_{BA}$ of the sensor 10B with respect to the sensor 10A on the basis of the observation results at each time points t=1 to 13 of the sensor 10A and of the sensor 10B.

The information processing apparatus 100 selects the set of sensor 10B and sensor 10D, and calculates an external parameter TDB of the sensor 10D with respect to the sensor 10B on the basis of the observation results at each time points t=1 to 13 of the sensor 10B and of the sensor 10D.

The information processing apparatus 100 selects the set of sensor 10D and sensor 10C, and calculates an external parameter $T_{CD}$ of the sensor 10C with respect to the sensor 10D on the basis of the observation results at each time points t=1 to 13 of the sensor 10D and of the sensor 10C.

The information processing apparatus 100 calculates the relative positions and orientations of the reference sensor 10A and the sensor 10C on the basis of the equation (1). For example, each T is a matrix containing a rotation matrix and a translation vector.

$$T_{CA} = T_{CD} T_{DB} T_{BA} \qquad (1)$$

As described above, the information processing apparatus 100 according to the present embodiment 1 executes observations by the sensors 10A to 10D while moving the target 2 at each time point, and specifies the share number indicating the number of times of a time point when the target 2 is detected at the same time point. The information processing apparatus 100 generates the target share number graph 50 in which the share number is the weight of the edge, and generates the sensor connectivity graph 51 obtained by leaving the edges E having the weight that is a predetermined number or more from the target share number graph 50. The set of nodes connected in the sensor connectivity graph 51 indicates a set of sensors in which the number of times the target 2 is observed at the same time point is a predetermined number or more.

Furthermore, the information processing apparatus 100 calculates the variance $\sigma^2$ of the positions of the target group observed by the set of two sensors at time points, sets "−2log$\sigma$" as the weight of each edge E, and reflects the variance of the target as a sensor in the sensor connectivity graph. In the sensor connectivity graph with the "−2log$\sigma$" as the weight of each edge E, the smaller the edge weight, the larger the spatial variance of the positions of the target group observed by the set of two sensors. The information processing apparatus 100 specifies the path that minimizes the sum of the edges E, and specifies the order of the sensors 10 to be selected when calculating the external parameters on the basis of the specified path. Thereby, the order of the sensors in which the spatial variance of the positions of the target group becomes as large as possible can be specified so that the calculation of the external parameters of the sensors 10 becomes stable. Therefore, for three or more sensors, information indicating relative positional relationships such as an arrangement positional relationship and an angle of view relationship may be accurately generated.

Figure 6:
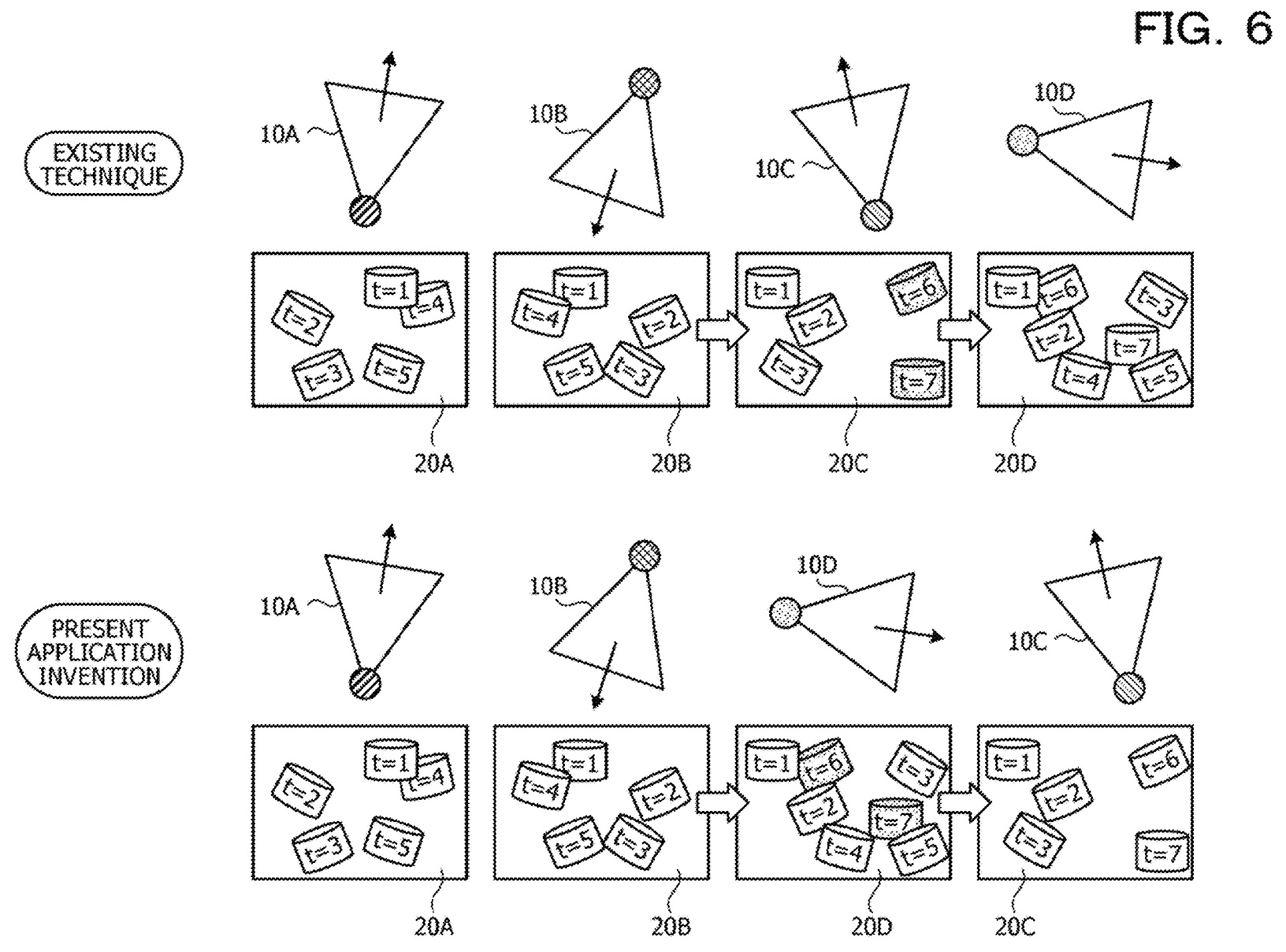
Figure 27:
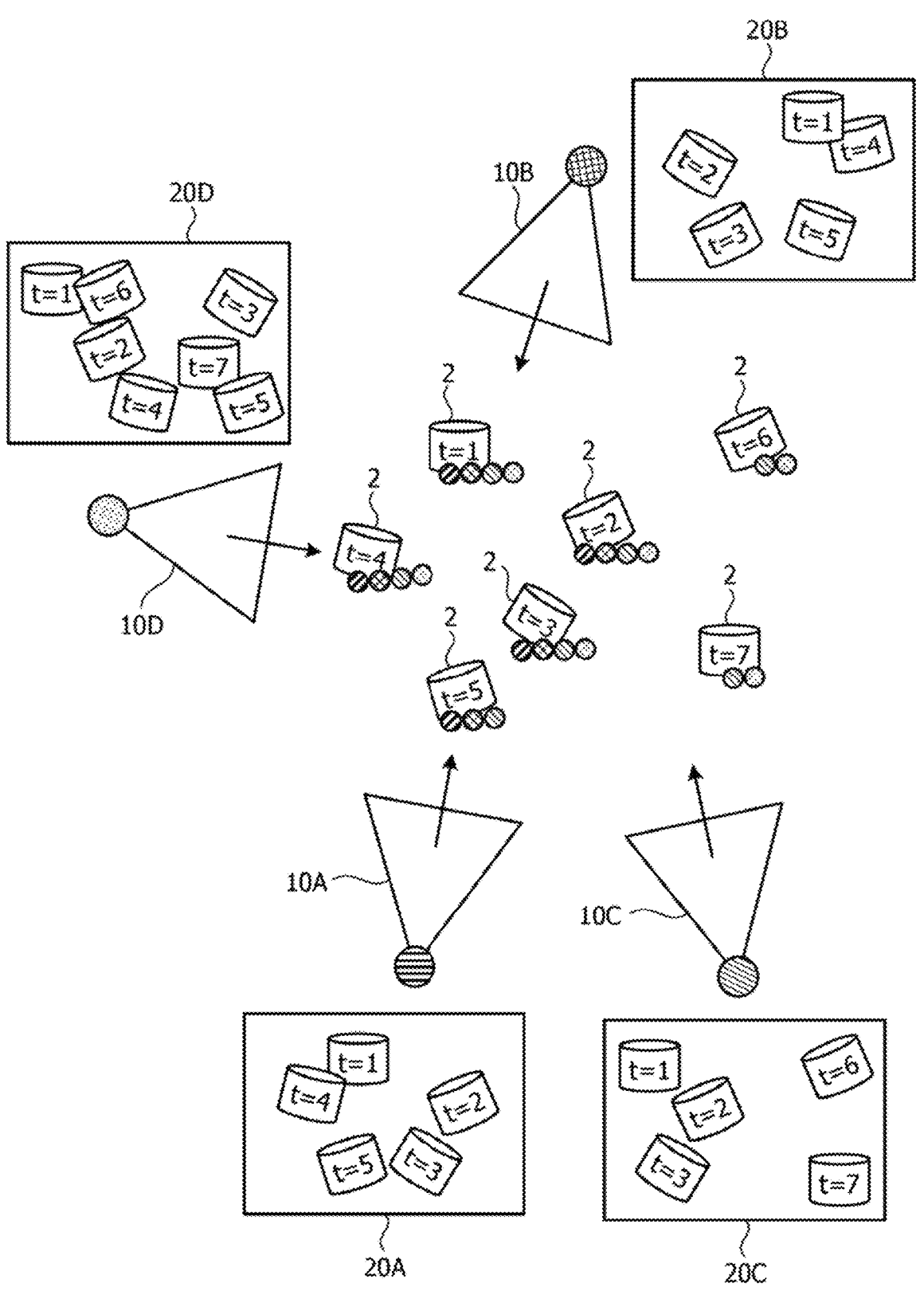
FIG. 27 is a diagram (1) for describing an existing technique 2.

FIG. 6 is a diagram for describing effects of the information processing apparatus according to the present embodiment 1. The upper part of FIG. 6 illustrates the order of selecting the sensors 10 in the case of using the existing technique 2. The lower row illustrates the order of selecting the sensors 10 specified by the information processing apparatus 100. Note that the information processing apparatus 100 is assumed to perform observation by the sensors 10 while moving the target 2 at time points t=1 to 7, and specify the order, similarly to the conditions described in FIG. 27. The observation results of the sensors 10A to 10D are assumed to be observation results 20A to 20D.

Figure 28:
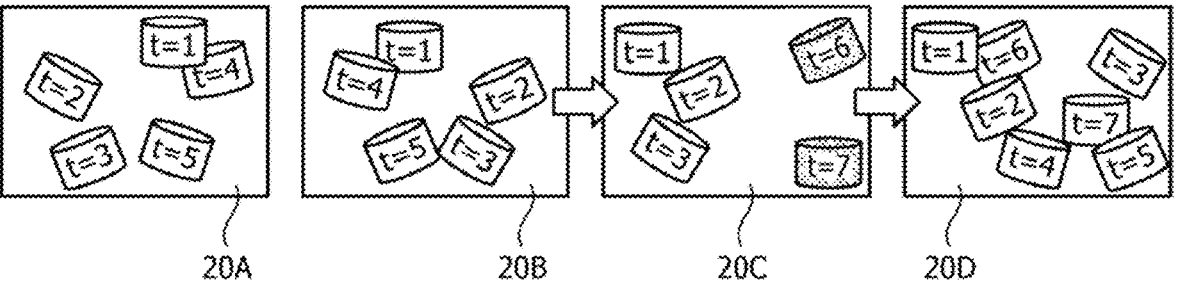
FIG. 28 is a diagram (2) for describing the existing technique 2.

As described with reference to FIG. 28, in the existing technique 2, the sensors 10 are selected in a predetermined order, such as the sensors 10A, 10B, 10C, and 10D. When the sensors 10 are selected in this order, the targets that can be used to estimate the external parameter decrease in the observation result 20C, and the distribution becomes biased. If the targets that can be used to estimate the external parameter are unevenly distributed, the estimation accuracy of the external parameter will become low.

In contrast, in the information processing apparatus 100, the sensors 10 are selected in the order of the sensors 10A, 10B, 10C, and 10D by using the sensor connectivity graph. When the sensors 10 are selected in this order, in the observation result 20D, the target 2 is not able to be used to calculate the external parameter at time points t=6 and 7 but the target 2 are evenly distributed in a field of view at time points t=1, 2, 3, 4, and 5, and the estimation accuracy of the external parameter is high. Furthermore, the decrease in the estimation accuracy in the case of selecting the observation result 20C in the subsequent stage and estimating the external parameter can also be suppressed.

Figure 7:
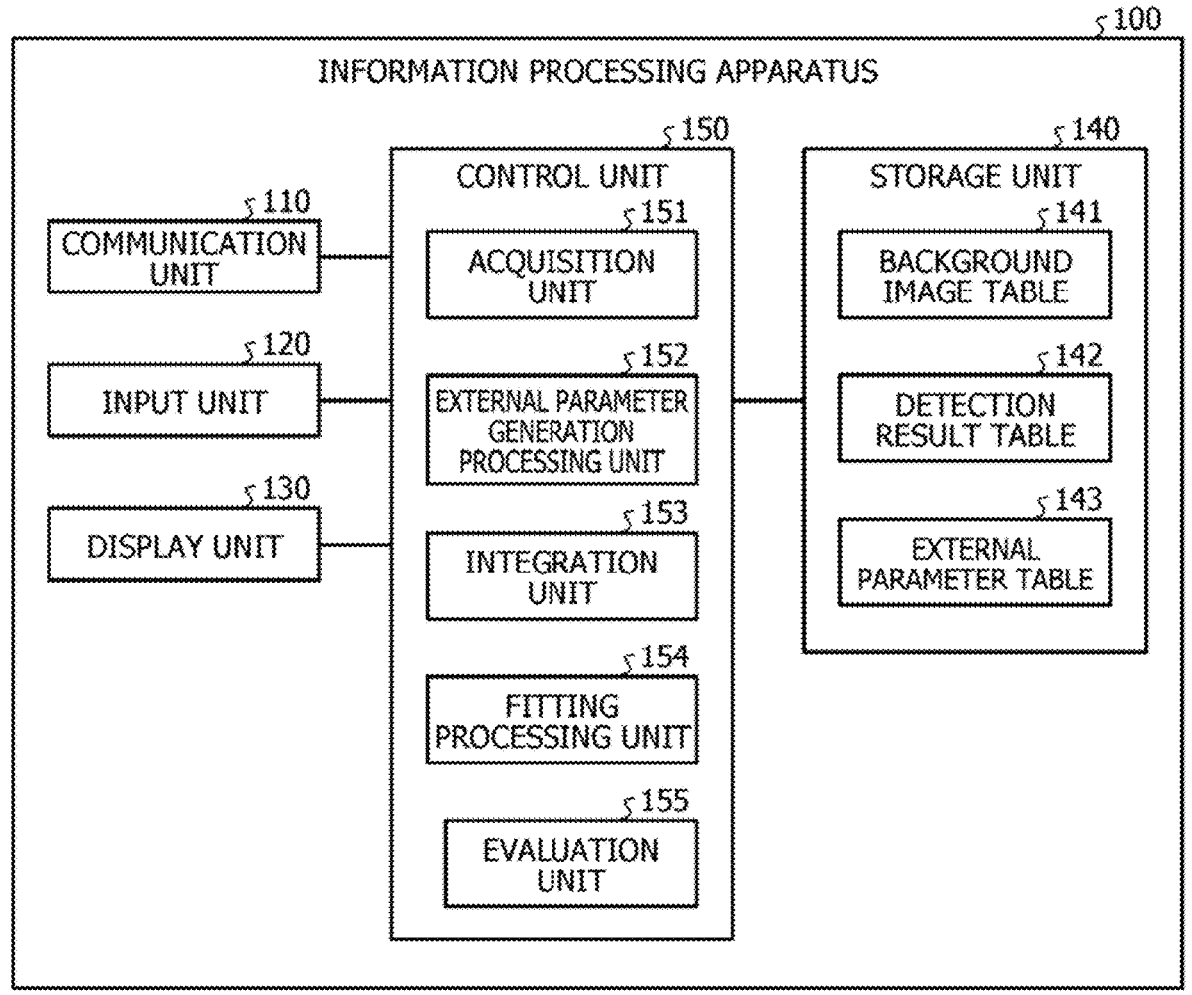
FIG. 7 is a functional block diagram illustrating a configuration of an information processing apparatus according to the present embodiment 1.

Next, a configuration of the information processing apparatus 100 illustrated in FIG. 1 will be described. FIG. 7 is a functional block diagram illustrating a configuration of the information processing apparatus according to the present embodiment 1. As illustrated in FIG. 7, the information processing apparatus 100 includes a communication unit 110, an input unit 120, a display unit 130, a storage unit 140, and a control unit 150.

The communication unit 110 is a processing unit that receives distance image data from the sensor 10 illustrated in FIG. 1. The communication unit 110 outputs the received distance image data to the control unit 150. The communication unit 110 is an example of a communication device.

The input unit 120 is an input device that inputs various types of information to the information processing apparatus 100. The input unit 120 corresponds to a keyboard, a mouse, a touch panel, and the like. For example, the user operates the input unit 120 to input information indicating that installation of the target 2 has been completed to the information processing apparatus 100 each time the installation of the target 2 has been completed at each time point.

The display unit 130 is a display device that displays information output from the control unit 150. For example, the display unit 130 displays skill certification, scoring results, and the like of various competitions. The display unit 130 corresponds to a liquid crystal display, an organic electro-luminescence (EL) display, a touch panel, or the like.

The storage unit 140 has a background image table 141, a detection result table 142, and an external parameter table 143. The storage unit 140 corresponds to a semiconductor memory element such as a random access memory (RAM) or a flash memory, or a storage device such as a hard disk drive (HDD).

The background image table 141 is a table that stores background image data (distance image data) measured by each of the sensors 10A to 10D in the state of absence of the target 2.

The detection result table 142 is a table that stores the point cloud and the position of the target 2 detected at each time point on the basis of the observation result of the sensor 10. FIG. 8 is a table illustrating an example of a data structure of the detection result table. As illustrated in FIG. 8, the detection result table 142 stores sensor identification information and point cloud information of the target 2 at each time point. The sensor identification information is information that identifies the sensor 10. For example, pieces of the sensor identification information SE10A, SE10B, SE10C, and SE10D correspond to the sensor 10A, the sensor 10B, the sensor 10C, and the sensor 10D, respectively. Furthermore, the point cloud information of the target is data indicating a relationship between a three-dimensional point cloud of the target 2 and three-dimensional coordinates of points included in the point cloud. Note that, in a case where the target is not detected at time point of the corresponding sensor identification information, "no target" is stored.

The external parameter table 143 is a table that stores the external parameters generated by an external parameter generation processing unit 152, which will be described below. FIG. 9 is a table illustrating an example of a data structure of an external parameter table. As illustrated in FIG. 9, the external parameter table 143 associates sensor identification information with an external parameter. The sensor identification information is information that identifies the sensor 10. The external parameter is data indicating position and orientation relative to the reference sensor 10. In the present embodiment 1, the reference sensor is the sensor 10A.

The external parameter $T_{BA}$ is data indicating the relative position and orientation of the sensor 10B with reference to the sensor 10A. An external parameter $T_{CA}$ is data indicating the relative position and orientation of the sensor 10C with reference to the sensor 10A. An external parameter $T_{DA}$ is data indicating the relative position and orientation of the sensor 10D with reference to the sensor 10A.

The control unit 150 includes an acquisition unit 151, the external parameter generation processing unit 152, an integration unit 153, a fitting processing unit 154, and an evaluation unit 155. The control unit 150 is implemented by a central processing unit (CPU) or a micro processing unit (MPU), or hard-wired logic such as an application specific integrated circuit (ASIC) or a field programmable gate array (FPGA), or the like.

The acquisition unit 151 is a processing unit that acquires the distance image data from the sensor 10 via the communication unit 110. For example, timing at which the acquisition unit 151 acquires the distance image data is instructed by the user who operates the input unit 120. The acquisition unit 151 takes a difference between the distance image data and the background image data stored in the background image table 141, and generates background difference image data. The acquisition unit 151 outputs the background difference image data to the external parameter generation processing unit 152.

Note that the acquisition unit 151 generates the background difference data corresponding to the sensor 10A by the difference between the distance image data measured by the sensor 10A and the background image data corresponding to the sensor 10A. The acquisition unit 151 generates the background difference data corresponding to the sensor 10B by the difference between the distance image data measured by the sensor 10B and the background image data corresponding to the sensor 10B.

The acquisition unit 151 generates the background difference data corresponding to the sensor 10C by the difference between the distance image data measured by the sensor 10C and the background image data corresponding to the sensor 10C. The acquisition unit 151 generates the background difference data corresponding to the sensor 10D by the difference between the distance image data measured by the sensor 10D and the background image data corresponding to the sensor 10D.

The acquisition unit 151 repeatedly executes the above processing each time the distance image data is acquired from the sensor 10 at each time point. In the case of outputting the background difference data to the external parameter generation processing unit 152, the acquisition unit 151 may also add information of time point t and the sensor identification information of the corresponding sensor 10 to the background difference data.

In the case of executing external calibration, the acquisition unit 151 outputs the background difference data to the external parameter generation processing unit 152. In the case of evaluating the performance performed by the object (not illustrated), the acquisition unit 151 outputs the background difference data to the integration unit 153. The acquisition unit 151 receives timing of performing the external calibration and timing of evaluating the performance from the input unit 120 operated by the user.

The external parameter generation processing unit 152 is a processing unit that generates the external parameters by executing the processing described with reference to FIGS. 2 to 5. The external parameter generation processing unit 152 stores the generated external parameters in the external parameter table 143.

Figure 10:
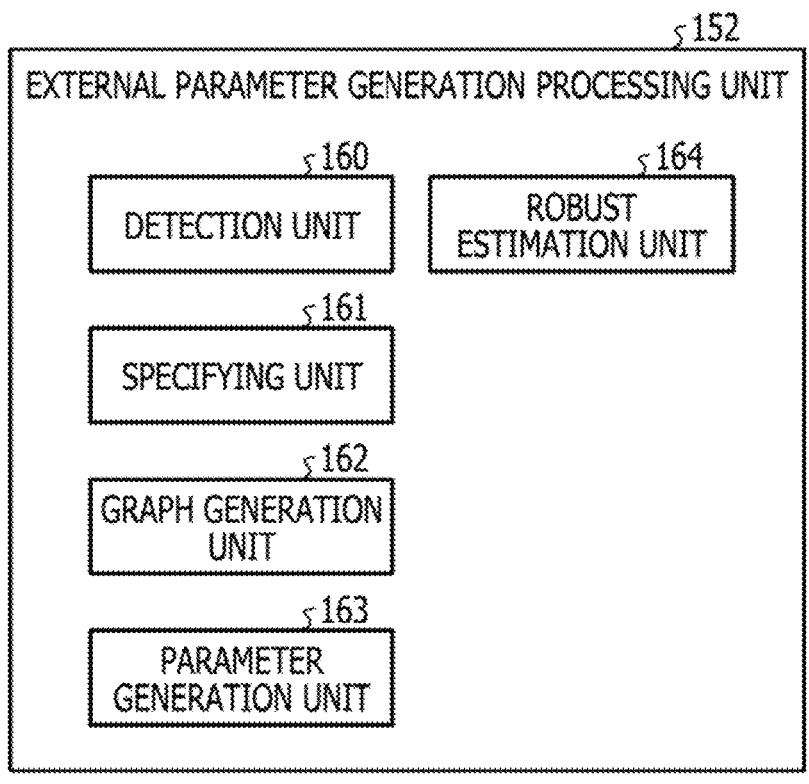
FIG. 10 is a functional block diagram illustrating a configuration of an external parameter generation processing unit.

FIG. 10 is a functional block diagram illustrating a configuration of the external parameter generation processing unit. As illustrated in FIG. 10, the external parameter generation processing unit 152 includes a detection unit 160, a specifying unit 161, a graph generation unit 162, a parameter generation unit 163, and a robust estimation unit 164.

The detection unit 160 is a processing unit that detects the target 2 at a plurality of time points. The detection unit 160 clusters each pixels (pixels excluding a background portion) left in the background difference data, and classifies each of the pixels into a plurality of clusters. The detection unit 160 removes a cluster in which the number of pixels belonging to the cluster is less than a predetermined number (the area of the cluster is less than a threshold value) among the clusters as noise.

The detection unit 160 is assumed to hold a conversion table that defines a relationship between a pixel position and a distance value, and a point and coordinates of the orthogonal coordinate system. The detection unit 160 converts each of the pixels included in the cluster into the three-dimensional point cloud on the basis of the conversion table. The detection unit 160 evaluates an error when fitting the three-dimensional point cloud of each cluster to a preset three-dimensional model surface of the target 2.

The detection unit 160 identifies the cluster with the smallest error when fitted as the target 2. The detection unit 160 may also execute fitting on the basis of iterative closest point (ICP) or the like. The three-dimensional point cloud of the cluster corresponding to the target 2 has a relationship between the point cloud and the coordinates of the orthogonal coordinate system of each point, and corresponds to the point cloud information.

The detection unit 160 stores the above point cloud information in the detection result table 142 on the basis of the sensor identification information and the time point information given to the background difference data. Note that, in the case where the above processing is executed on the basis of the background difference data and no target 2 is observed by the sensor 10, the detection unit 160 stores information of no target in the detection result table 142. The detection unit 160 repeatedly executes the above processing each time the background difference data is acquired.

The specifying unit 161 is a processing unit that specifies the share number for each set of two sensors 10.

For example, the specifying unit 161 acquires the data in the detection result table 142 and specifies whether the sensors 10A to 10D have detected the target at each time point. The specifying unit 161 specifies the number of times of a time point (the share number) when the target 2 is detected at the same time point among the plurality of time points by a set of two sensors 10 among the sensors 10A to 10D. Specific processing for the specifying unit 161 to specify the share number corresponds to the processing of the information processing apparatus 100 described with reference to FIG. 2.

The specifying unit 161 outputs data of the share number specified for each set of two sensors 10 to the graph generation unit 162. For example, in the case where the observation result of the target 2 at each time point is the one described in FIG. 2, the share number for the set of sensors 10A and 10B is "4". The share number for the set of sensors 10A and 10C is "1". The share number for the set of sensors 10A and 10D is "0". The share number for the set of sensors 10B and 10C is "4". The share number for the set of sensors 10B and 10D is "3". The share number for the set of sensors 10C and 10D is "4".

The graph generation unit 162 is a processing unit that generates the sensor connectivity graph 51.

For example, the graph generation unit 162 generates the target share number graph 50 on the basis of the data of the share number specified for each set of two sensors 10. The share number for the set of sensors 10A and 10B is "4", the share number for the set of sensors 10A and 10C is "1", the share number for the set of sensors 10A and 10D is "0", and the share number for the set of sensors 10B and 10C is "4", and the share number for the set of sensors 10B and 10D is "3". Then, the target share number graph 50 generated by the graph generation unit 162 is as described in FIG. 3.

The graph generation unit 162 generates the sensor connectivity graph 51 by leaving the edges having the weight of "3" or more among the edges E. In the example illustrated in FIG. 3, the graph generation unit 162 generates the sensor connectivity graph 51 by deleting the edge $E_{CA}$ from the target share number graph 50 and leaving the edges $E_{BA}$, $E_{CB}$, $E_{DB}$, and $E_{CD}$.

Furthermore, the graph generation unit 162 executes the processing of reflecting the variance of the target on the sensor connectivity graph 51. As described in FIG. 4, the graph generation unit 162 calculates the variance $\sigma^2$ of the positions of the target group observed by the set of two sensors at each time points. The graph generation unit 162 sets "$-2\log\sigma$" as the weight of each edge E, and reflects the variance of the target in the sensor connectivity graph.

As described in FIG. 2, for the set of sensor 10A and sensor 10B, the target 2 is observed at time points t=3, 4, 5, and 6 among time points t=1 to 13. The graph generation unit 162 calculates the variance $\sigma^2_{BA}$ of the positions of the targets 2 at time points t=3, 4, 5, and 6 observed by the sensor 10A (or the sensor 10B). For example, assuming that "$-2\log\sigma_{BA}$" is "$-2.7$", the graph generation unit 162 sets the weight "$-2.7$" in the edge $E_{BA}$.

The graph generation unit 162 identifies the positions of the target 2 at time points t=3, 4, 5, and 6 observed by the sensor 10A from the detection result table 142. For example, the center of gravity coordinates of the coordinates of each of the points included in the point cloud information of the target 2 may also be used as the position of the target 2.

The graph generation unit 162 similarly calculates the variance $\sigma^2_{CB}$, the variance $\sigma^2_{DB}$, and the variance $\sigma^2_{CD}$ for the set of sensor 10B and sensor 10C, the set of sensor 10B and sensor 10D, and the set of sensor 10C and sensor 10D. The graph generation unit 162 sets the weight "$-1.2$", the weight "$-3.2$", and the weight "$-3.4$" for the edge $E_{CB}$, the edge $E_{DB}$, and the edge $E_{CD}$, respectively. The graph generation unit 162 outputs the data of the sensor connectivity graph 51 in which the edge weights are set to the parameter generation unit 163.

The parameter generation unit 163 generates the external parameter between two sensors having connectivity on the basis of the sensor connectivity graph 51. The parameter generation unit 163 stores the external parameters in the external parameter table 143. Furthermore, the parameter generation unit 163 may also transmit the external parameters to a preset external device. The parameter generation unit 163 generates an external parameter between two sensors having no connectivity on the basis of the sensor connectivity graph 51 and the generated external parameters. An example of processing of the parameter generation unit 163 will be described below.

The parameter generation unit 163 executes the shortest path search to determine the path that minimizes the sum of the edges E for the sensor connectivity graph 51. For example, the parameter generation unit 163 selects a path P that minimizes the sum of the edges E, using the Bellman-Ford method or the like.

As described in FIG. 4, assuming that the reference node is the node 50A corresponding to the sensor 10A, the path P that minimizes the sum of the edges E is in the order of the node 50A, node 50B, node 50D, and node 50C.

The parameter generation unit 163 specifies the set of sensors 10A and 10B, the set of sensors 10B and 10D, and the set of sensors 10D and 10C as two sensors having connectivity. The parameter generation unit 163 specifies the set of sensors 10A and 10C as the two sensors having no connectivity.

The parameter generation unit 163 performs alignment by singular value decomposition from the relationship between the positions of the target 2 at time points t=3, 4, 5, and 6 of the sensor 10A and the positions of the target 2 at time points t=3, 4, 5, and 6 of the sensor 10B, and calculates the initial value of the external parameter $T_{BA}$.

The parameter generation unit 163 performs alignment by singular value decomposition from the relationship between the positions of the target 2 at time points t=8, 9, and 12 of the sensor 10B and the positions of the target 2 at time points t=8, 9, and 12 of the sensor 10D, and calculates the initial value of the external parameter $T_{DB}$.

The parameter generation unit 163 performs alignment by singular value decomposition from the relationship between the position of the target 2 at time point of the sensor 10D and the position of the target 2 at time point of the sensor 10C, and calculates the initial value of the external parameter $T_{CD}$.

The parameter generation unit 163 executes optimization of external parameters $T_{BA}$, $T_{DB}$, and $T_{CD}$ (fitting of the target 2 shape) using bundle adjustment and maximum likelihood estimation, and calculates the final external parameters $T_{BA}$, $T_{DB}$, and $T_{CD}$. Each external parameter $T_{BA}$, $T_{DB}$, or $T_{CD}$ between two sensors having connectivity corresponds to "information indicating a first correlation positional relationship".

The parameter generation unit 163 calculates the external parameter $T_{CA}$ on the basis of the equation (1) and the external parameters $T_{BA}$, $T_{DB}$, and $T_{CD}$. The external parameter $T_{CA}$ is an external parameter between two sensors not having connectivity and corresponds to "information indicating a second correlation positional relationship".

The parameter generation unit 163 stores the external parameters $T_{BA}$, $T_{CA}$, and $T_{DA}$ with reference to the sensor 10A in the external parameter table 143. Note that the parameter generation unit 163 calculates the external parameter $T_{DA}$ indicating the relative position and orientation of the sensor 10D with respect to the sensor 10A by the equation (2).

$$T_{DA}=T_{DB}T_{BA} \tag{2}$$

Figure 11:
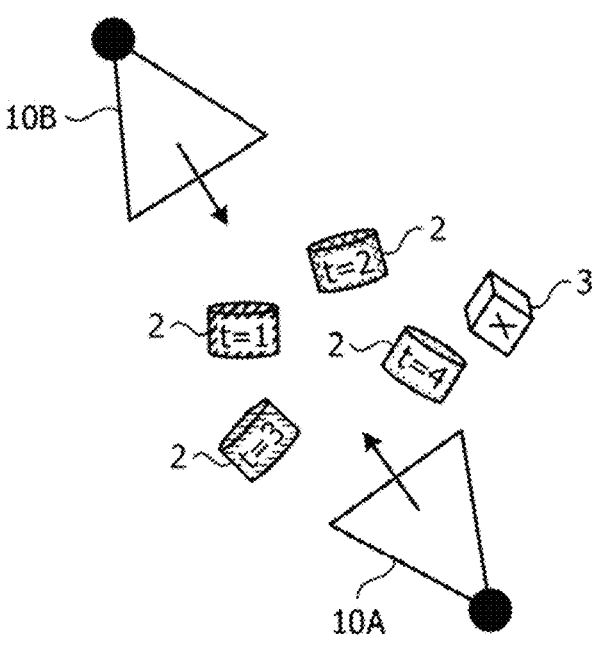
FIG. 11 is a diagram (1) for describing processing of a robust estimation unit.

The robust estimation unit 164 is a processing unit that detects erroneous detection of the target 2. FIGS. 11 to 15 are diagrams for describing processing of the robust estimation unit. Here, as an example, the description will be given on the basis of the sensor 10A and the sensor 10B. As illustrated in FIG. 11, it is assumed that the target 2 is observed by the sensor 10A and the sensor 10B while moving the target 2 at time points t=1 to 4. Note that it is assumed that a foreground object 3 having a characteristic similar to the target 2 is included in the observation result of the sensor 10B at time t=2.

Figure 12:
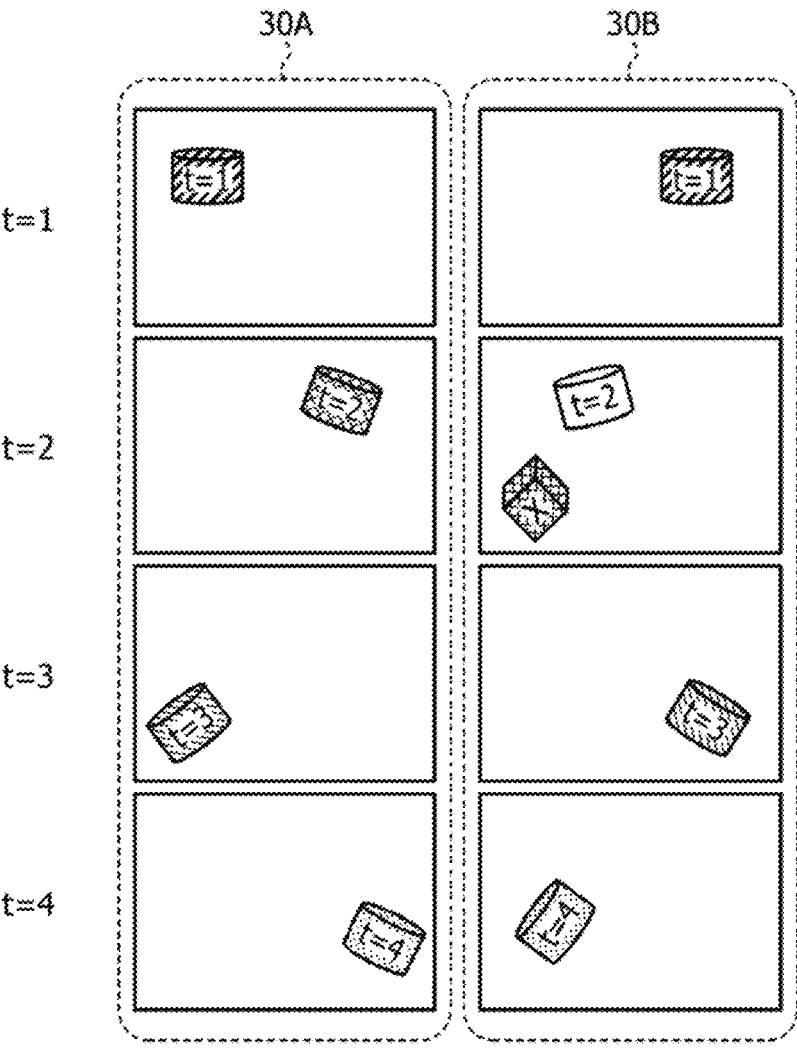
FIG. 12 is a diagram (2) for describing the processing of the robust estimation unit.

The observation results of the sensor 10A and the sensor 10B are illustrated in FIG. 12. An observation result 30A indicates the observation results at the time points t=1 to 4 of the sensor 10A. The observation result 30B indicates the observation results at time points t=1 to 4 of the sensor 10B. For example, it is assumed that the foreground object 3 is erroneously detected as the target 2 instead of the target 2 at time point t=2 of the observation result 30B, and is stored in the detection result table 142.

Figure 13:
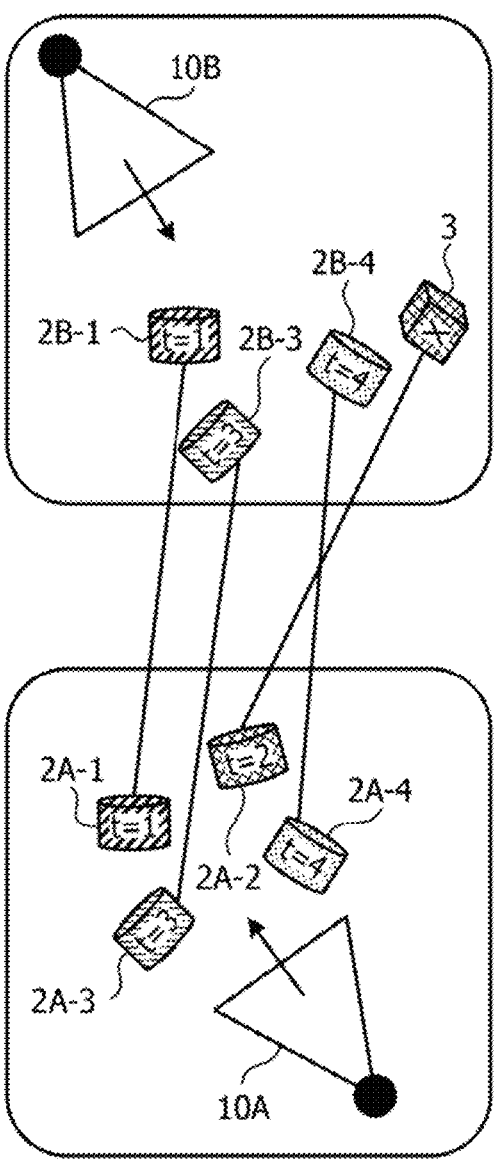
FIG. 13 is a diagram (3) for describing the processing of the robust estimation unit.

The description proceeds to FIG. 13. Codes of the target 2 observed by the sensor 10A at time points t=1 to 4 are 2A-1, 2A-2, 2A-3, and 2A-4. The codes of the target 2 observed by the sensor 10B at time points t=1, 3, and 4 are 2B-1, 2B-3, and 2B-4. The sensor 10B observes the foreground object 3 at time point t=2.

The robust estimation unit 164 associates the target 2 (foreground objects 3) observed at the same time point. For example, the robust estimation unit 164 associates the target 2A-1 with the target 2B-1. The robust estimation unit 164 associates the target 2A-2 with the foreground object 3. The robust estimation unit 164 associates the target 2A-3 with the target 2B-3. The robust estimation unit 164 associates the target 2A-4 with the target 2B-4.

The robust estimation unit 164 calculates the external parameter $T_{BA}$ that minimizes the sum of the distances between the positions of the corresponding pair of targets according to the above correspondence relationship. For example, robust estimation unit 164 optimizes the external parameter $T_{BA}$ between sensor 10A and sensor 10B using bundle estimation and maximum likelihood estimation after estimating an initial value, and finally calculates the external parameter $T_{BA}$.

Figure 14:
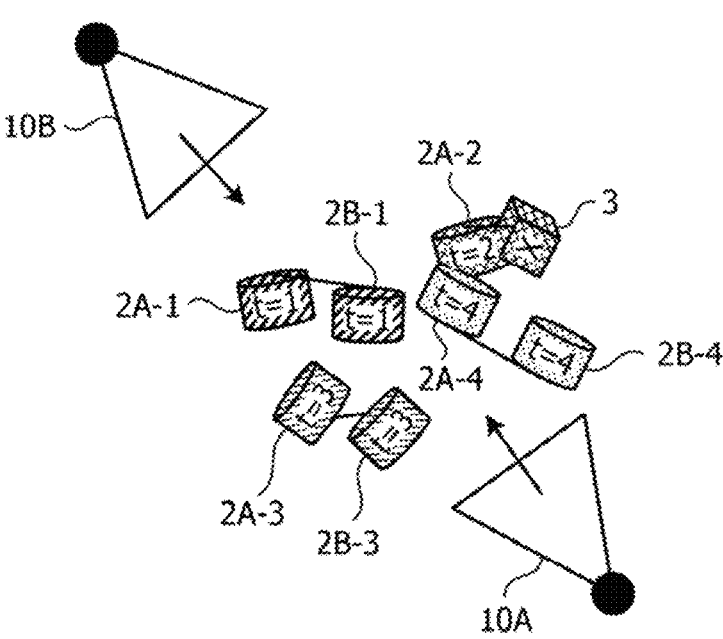
FIG. 14 is a diagram (4) for describing the processing of the robust estimation unit.
Figure 15:
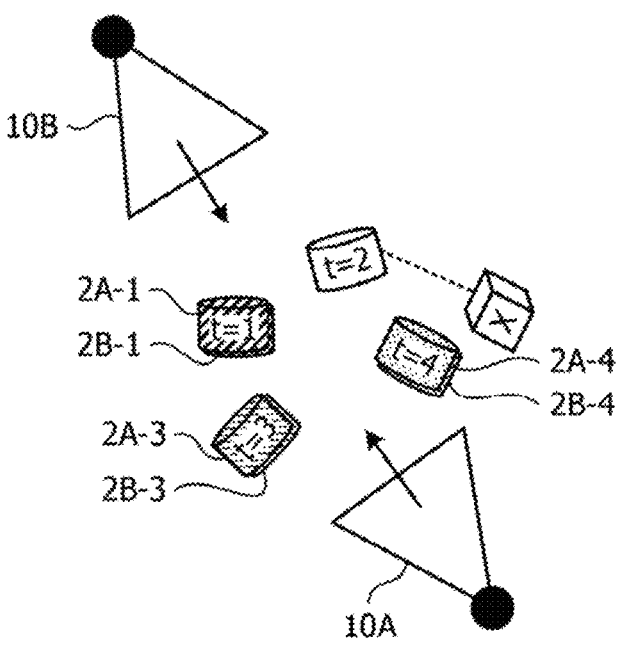
FIG. 15 is a diagram (5) for describing the processing of the robust estimation unit.

When the robust estimation unit 164 corrects the positions of the respective target 2 of the observation result 30B to the positions with reference to the sensor 10A, using the external parameter $T_{BA}$, the corrected positions become those illustrated in FIG. 14. Due to the influence of erroneous association (the target 2A-2 and the foreground object 3), the positions of the set of the associated targets 2A-1 and 2B-1, the positions of the set of the targets 2A-3 and 2B-3, and the positions of the set of the targets 2A-4 and 2B-4 do not match.

The robust estimation unit 164 determines that noise (foreground object 3) is observed when the average of the distances between each of the associated targets is equal to or larger than a threshold value, and executes the following processing. The robust estimation unit 164 calculates the external parameter $T_{BA}$ by excluding one of the sets of targets associated with each other at each time point.

For example, the robust estimation unit 164 generates an external parameter $T_{BA1}$, excluding the set of the target 2A-1 and the target 2B-1 at time t=1. The robust estimation unit 164 generates an external parameter $T_{BA2}$, excluding the set of the target 2A-2 at time t=2 and the foreground object 3. The robust estimation unit 164 generates an external parameter $T_{BA3}$, excluding the set of the target 2A-3 and 2B-3 at time t=3. The robust estimation unit 164 generates an external parameter $T_{BA4}$, excluding the set of the target 2A-4 and the target 2B-4 at time t=4.

The robust estimation unit 164 uses the external parameter $T_{BA1}$ to correct the positions of the respective targets 2 (excluding the set of targets 2A-1 and 2B-1) of the observation result 30B to the positions with reference to the sensor 10A, and calculates an average (first average value) of the distances between each of the associated targets.

The robust estimation unit 164 uses the external parameter $T_{BA2}$ to correct the positions of the respective targets 2 (excluding the set of target 2A-2 and the foreground object 3) of the observation result 30B to the positions with reference to the sensor 10A, and calculates an average (second average value) of the distances between each of the associated targets. For example, the result of correcting the positions of the respective targets 2 (excluding the set of the target 2A-2 and the foreground object 3) to the positions with reference to the sensor 10A, using the external parameter $T_{BA2}$ becomes the positions illustrated in FIG. 15. The influence of erroneous association (the target 2A-2 and the foreground object 3) is eliminated, and the positions of the set of the associated targets 2A-1 and 2B-1, the positions of the set of the targets 2A-3 and 2B-3, and the positions of the set of the targets 2A-4 and 2B-4 match (the second average value becomes small).

The robust estimation unit 164 uses the external parameter $T_{BA3}$ to correct the positions of the respective targets 2 (excluding the set of targets 2A-3 and 2B-3) of the observation result 30B to the positions with reference to the sensor 10A, and calculates an average (third average value) of the distances between each of the associated targets.

The robust estimation unit 164 uses the external parameter $T_{BA4}$ to correct the positions of the respective targets 2 (excluding the set of targets 2A-4 and 2B-4) of the observation result 30B to the positions with reference to the sensor 10A, and calculates an average (fourth average value) of the distances between each of the associated targets.

The robust estimation unit 165 compares the first average value, the second average value, the third average value, and the fourth average value, and determines whether there is a sufficiently smaller average value than the other average values. For example, in the case where the second average value is sufficiently smaller than the first, third, and fourth average values, the target 2A-2 and the foreground object 3 are excluded from the target 2. For example, the information of the target 2 observed at time point t=2 is deleted from the detection result table 142. For example, in the case where the second average value is larger than the first, third, and fourth average values, and the difference is sufficiently smaller than a threshold value, the robust estimation unit 165 determines that the second average value is sufficiently small.

For example, the robust estimation unit 165 executes the above processing after the detection result table 142 is generated by the detection unit 160 and before the processing by the specifying unit 161, the graph generation unit 162, and the parameter generation unit 163 is started. Thereby, the noise (foreground object 3) that is erroneous detection of something other than the target can be removed.

The description returns to FIG. 7. The integration unit 153, the fitting processing unit 154, and the evaluation unit 155 execute processing when the external calibration is completed by the external parameter generation processing unit 152 and the object starts performance.

The integration unit 153 acquires the background difference data of each of the sensors 10A to 10D from the acquisition unit 151. The integration unit 153 converts the relationship between each pixel and the distance value included in the background difference data into the relationship between the point cloud and the coordinates of the orthogonal coordinate system of each point, using the conversion table. The converted background difference data is referred to as "three-dimensional point cloud data". The conversion table is a table that defines the relationship between the pixel position and the distance value, and the point and the coordinates of the orthogonal coordinate system.

The integration unit 153 uses the sensor 10A as the reference sensor 10 and adjusts the three-dimensional point cloud data of the sensors 10B to 10D to the position and orientation of the sensor 10A. For example, the integration unit 153 uses the external parameter $T_{BA}$ to adjust the three-dimensional point cloud data of the sensor 10B to the position and orientation of the sensor 10A. The integration unit 153 uses the external parameter $T_{CA}$ to adjust the three-dimensional point cloud data of the sensor 10C to the position and orientation of the sensor 10A. The integration unit 153 uses the external parameter $T_{DA}$ to adjust the three-dimensional point cloud data of the sensor 10D to the position and orientation of the sensor 10A. The integration unit 153 acquires each external parameter from the external parameter table 143.

The integration unit 153 integrates the three-dimensional point cloud data of the sensor 10A and the three-dimensional point cloud data of the sensors 10B to 10D adjusted to the position and orientation of the sensor 10A to generate one three-dimensional point cloud data. The integration unit 153 outputs the generated three-dimensional point cloud data to the fitting processing unit 154.

The integration unit 153 repeatedly executes the above processing each time the background difference data of the sensors 10A to 10D is acquired from the acquisition unit 151.

The fitting processing unit 154 is a processing unit that executes fitting that applies a three-dimensional model data of the object to the three-dimensional point cloud data. The fitting processing unit 154 specifies skeleton model data of the object on the basis of the fitting result. The skeleton model data includes position information of each joint. The fitting processing unit outputs the skeleton model data to the evaluation unit 155. The fitting processing unit repeatedly executes the above processing every time the three-dimensional point cloud data is acquired from the integration unit 153.

The evaluation unit 155 is a processing unit that acquires the skeleton model data in time series and evaluates the performance of the object on the basis of transition of each joint coordinate of the skeleton model data. For example, the evaluation unit 155 evaluates the performance of the object using a table (not illustrated) that defines the transition of each joint coordinate, a type of technique, and success or failure of technique, and outputs the evaluation result to the display unit 130.

Note that the evaluation of technique performed by the evaluation unit 155 can be applied to various scoring competitions. Other scoring competitions include, in addition to gymnastics, trampoline, swim diving, figure skating, karate style, ballroom dance, snowboarding, skateboarding, ski aerial, and surfing. Furthermore, it may also be applied to form check of classical ballet, ski jump, mogul air, turn, baseball, and basketball, and the like. Furthermore, it may also be applied to competitions such as kendo, judo, wrestling, and sumo. Moreover, it may also be used to evaluate whether or not a weight lifting barbell has been lifted.

Figure 16:
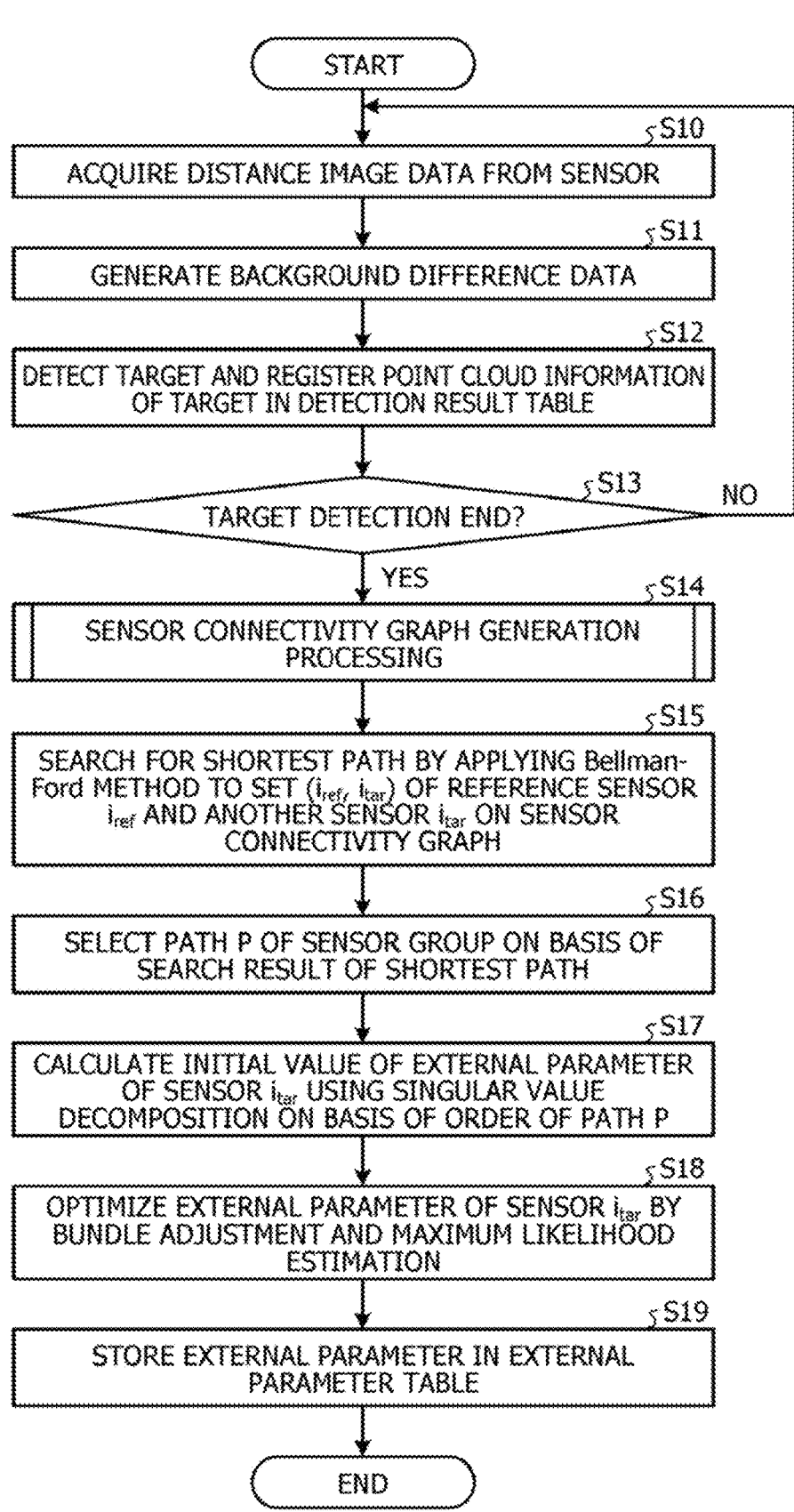
FIG. 16 is a flowchart illustrating a processing procedure of the information processing apparatus according to the present embodiment 1.

Next, an example of a processing procedure in which the information processing apparatus 100 according to the present embodiment 1 executes the external calibration will be described. FIG. 16 is a flowchart illustrating a processing procedure of the information processing apparatus according to the present embodiment 1. As illustrated in FIG. 16, the acquisition unit 151 of the information processing apparatus 100 acquires the distance image data from the sensor 10 (step S10). The acquisition unit 151 takes the difference between the distance image data and the background image data and generates the background difference data (step S11).

The detection unit 160 of the information processing apparatus 100 detects the target from the background difference data, and registers the point cloud information of the target in the detection result table 142 (step S12). In the case of not terminating the target detection (steps S13, No), the information processing apparatus 100 proceeds to step S10 again. On the other hand, in the case of terminating the target detection (steps S13, Yes), the information processing apparatus 100 proceeds to step S14.

The external parameter generation processing unit 152 (specifying unit 161 and graph generation unit 162) of the information processing apparatus 100 executes the sensor connectivity graph generation processing (step S14). The parameter generation unit 163 of the information processing apparatus 100 applies the Bellman-Ford method to a sensor connectivity graph 31 for a set $(i_{ref}, i_{tar})$ of a reference sensor $i_{ref}$ and another sensor $i_{tar}$ to obtain the shortest path (step S15). For example, the reference sensor $i_{ref}$ corresponds to the sensor 10A. The another sensor $i_{tar}$ corresponds to the sensor 10B, 10C, or 10D.

The parameter generation unit 163 selects the path P of the sensor group on the basis of the search result of the shortest path (step S16). The parameter generation unit 163 calculates the initial value of the external parameter of the sensor $i_{tar}$ using the singular value decomposition on the basis of the order of the path P (step S17).

The parameter generation unit 163 optimizes the external parameter of the sensor $i_{tar}$ by bundle adjustment and maximum likelihood estimation (step S18). The parameter generation unit 163 stores the external parameter in the external parameter table 143 (step S19). The processing of step S19 also corresponds to the processing of transmitting the external parameter to an external device.

Figure 17:
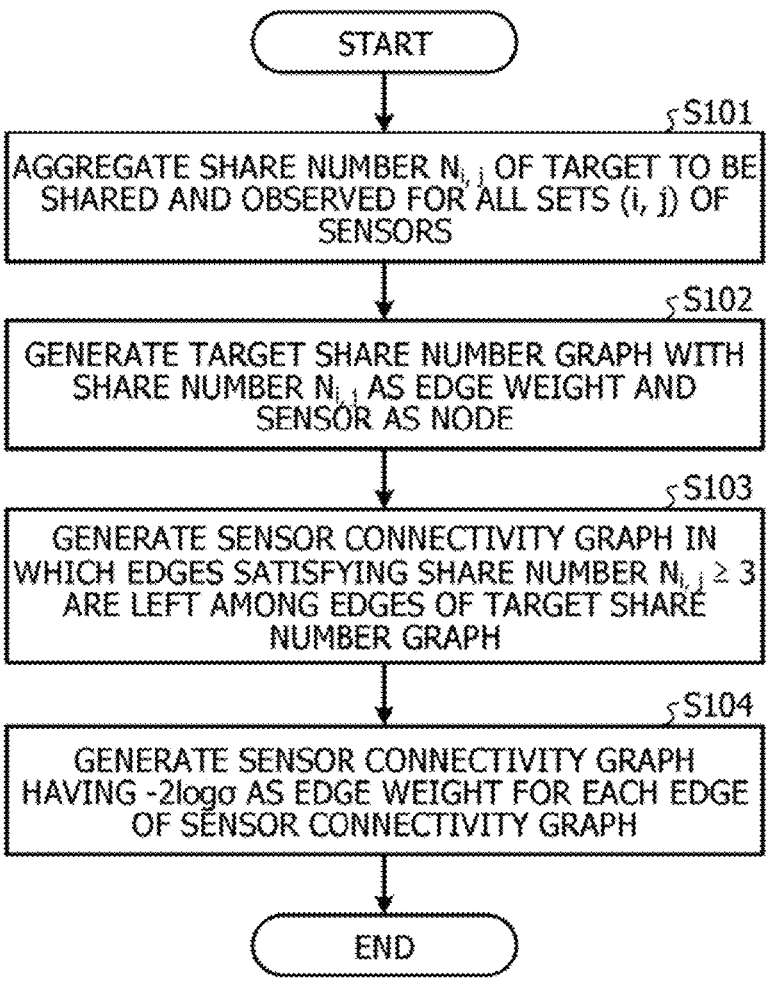
FIG. 17 is a flowchart illustrating a processing procedure of sensor connectivity graph generation processing.

Next, an example of a processing procedure of the sensor connectivity graph generation processing illustrated in step S14 of FIG. 16 will be described. FIG. 17 is a flowchart illustrating a processing procedure of the sensor connectivity graph generation processing. As illustrated in FIG. 17, the specifying unit 161 of the information processing apparatus 100 aggregates the share number $N_{i, j}$ of the target to be shared and observed for all the sets of sensors (i, j) (step S101).

The graph generation unit 162 of the information processing apparatus 100 generates the target share number graph 50 with the share number $N_{i, j}$ as an edge weight and the sensor 10 as a node (step S102). The graph generation unit 162 generates the sensor connectivity graph in which the edges satisfying the share number $N_{i, j} \geq 3$ are left among the edges of the target share number graph (step S103).

The graph generation unit 162 generates the sensor connectivity graph having $-2\log\sigma$ as the edge weight for each edge of the sensor connectivity graph (step S104).

Next, effects of the information processing apparatus 100 according to the present embodiment 1 will be described. The information processing apparatus 100 executes observations by the sensors 10A to 10D while moving the target 2 at each time point, and specifies the share number indicating the number of times of a time point when the target 2 is detected at the same time point. The information processing apparatus 100 generates the target share number graph 50 in which the share number is the weight of the edge, and generates the sensor connectivity graph 51 obtained by leaving the edges E having the weight that is a predetermined number or more from the target share number graph 50. Thereby, the set of sensors in which the number of times the target 2 is observed at the same time point is a predetermined number or more can be specified.

The information processing apparatus 100 calculates the variance $\sigma^2$ of the positions of the target group observed by the set of two sensors at time points, sets "$-2\log\sigma$" as the weight of each edge E, and reflects the variance of the target in the sensor connectivity graph 51. In the sensor connectivity graph with the "$-2\log\sigma$" as the weight of each edge E, the smaller the edge weight, the larger the spatial variance of the positions of the target group observed by the set of two sensors. The information processing apparatus 100 specifies the path that minimizes the sum of the edges E, and specifies the order of the sensors 10 to be selected when calculating the external parameters on the basis of the specified path. Thereby, the order of the sensors in which the spatial variance of the positions of the target group becomes as large as possible can be specified so that the calculation of the external parameters of the sensors 10 becomes stable. Therefore, according to the information processing apparatus 100, information indicating relative positional relationships such as an arrangement positional relationship and an angle of view relationship may be accurately generated for three or more sensors.

By the way, the information processing apparatus 100 according to the present embodiment 1 executes the external calibration using the cylindrical target 2 as a target and generates the external parameters, but the present embodiment is not limited thereto. For example, the information processing apparatus 100 may also use a spherical marker as a target.

Figure 18:
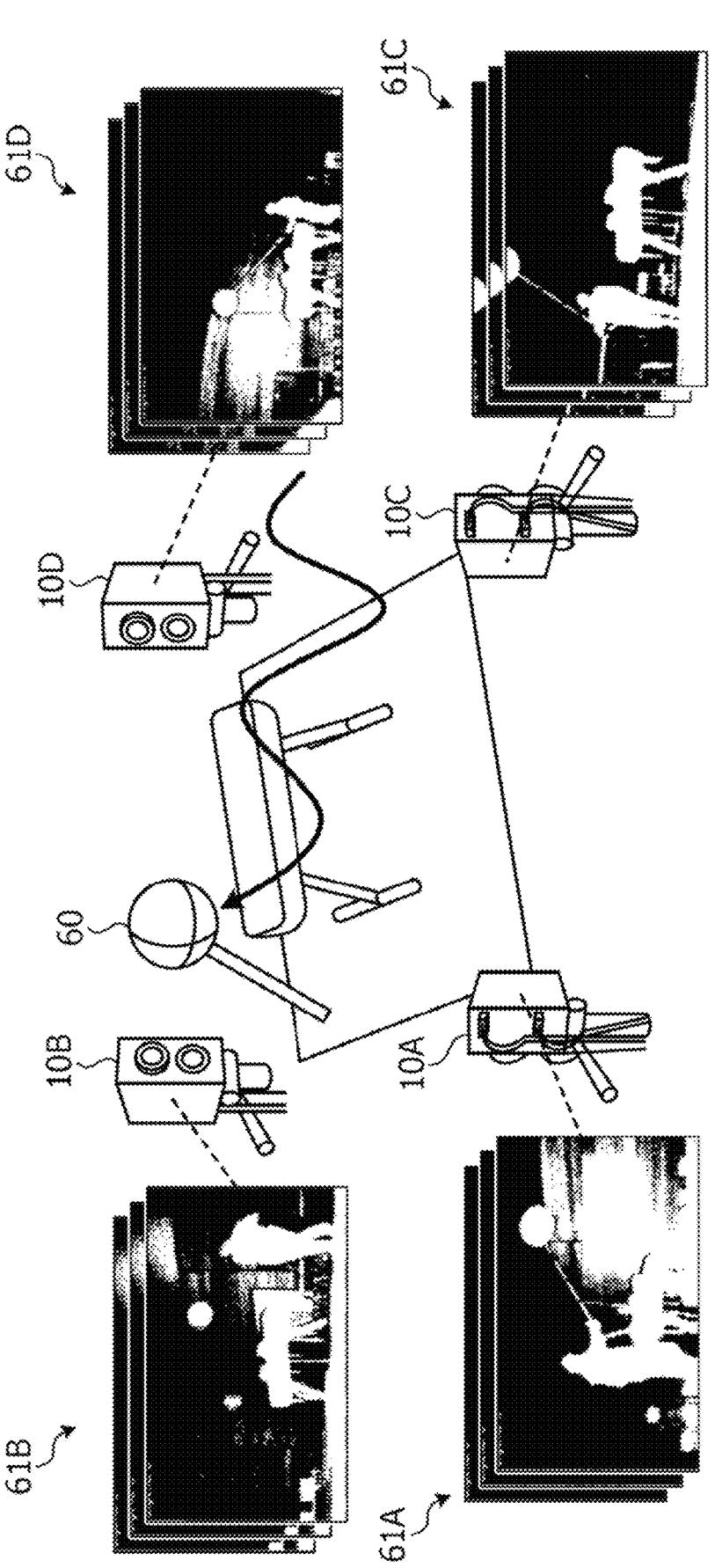
FIG. 18 is a diagram (1) illustrating an example of external calibration using a spherical marker.
Figure 19:
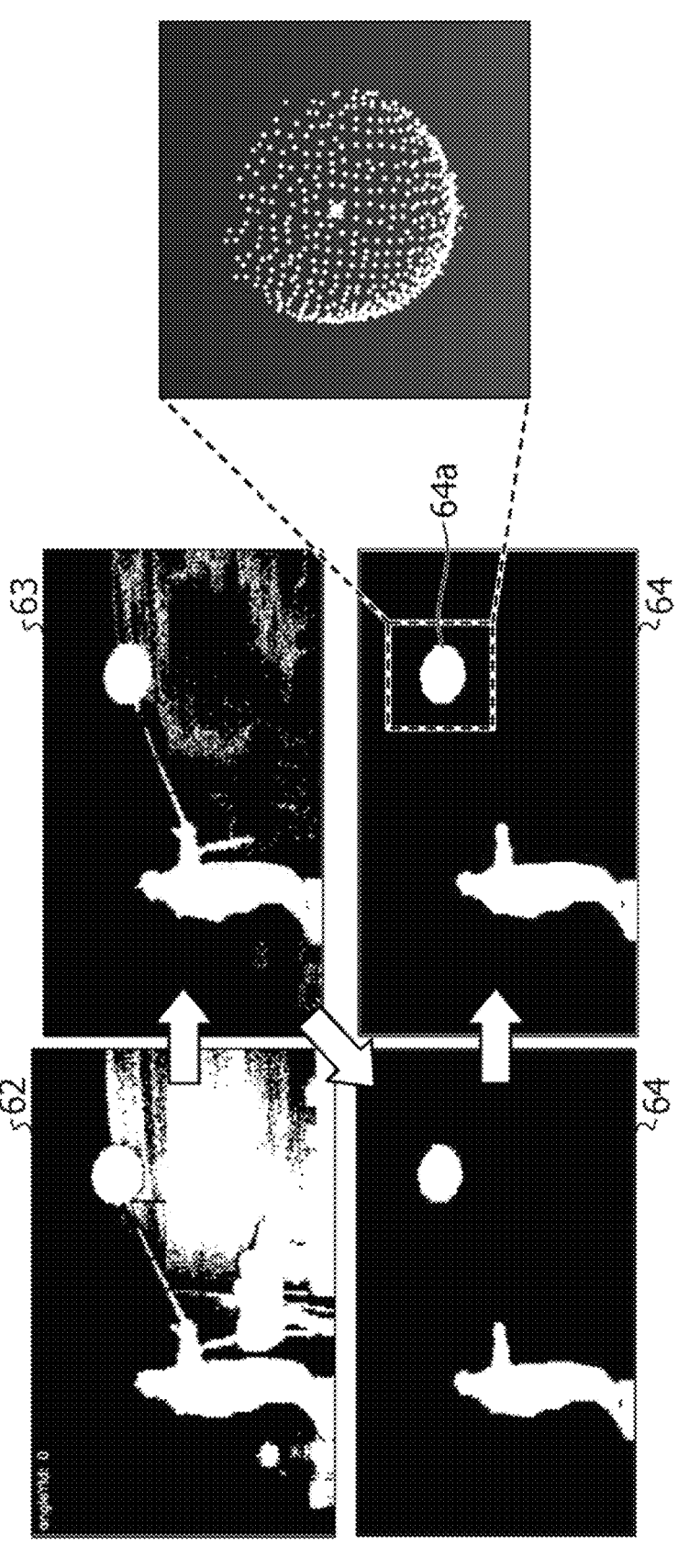
FIG. 19 is a diagram (2) illustrating an example of external calibration using a spherical marker.
Figure 20:
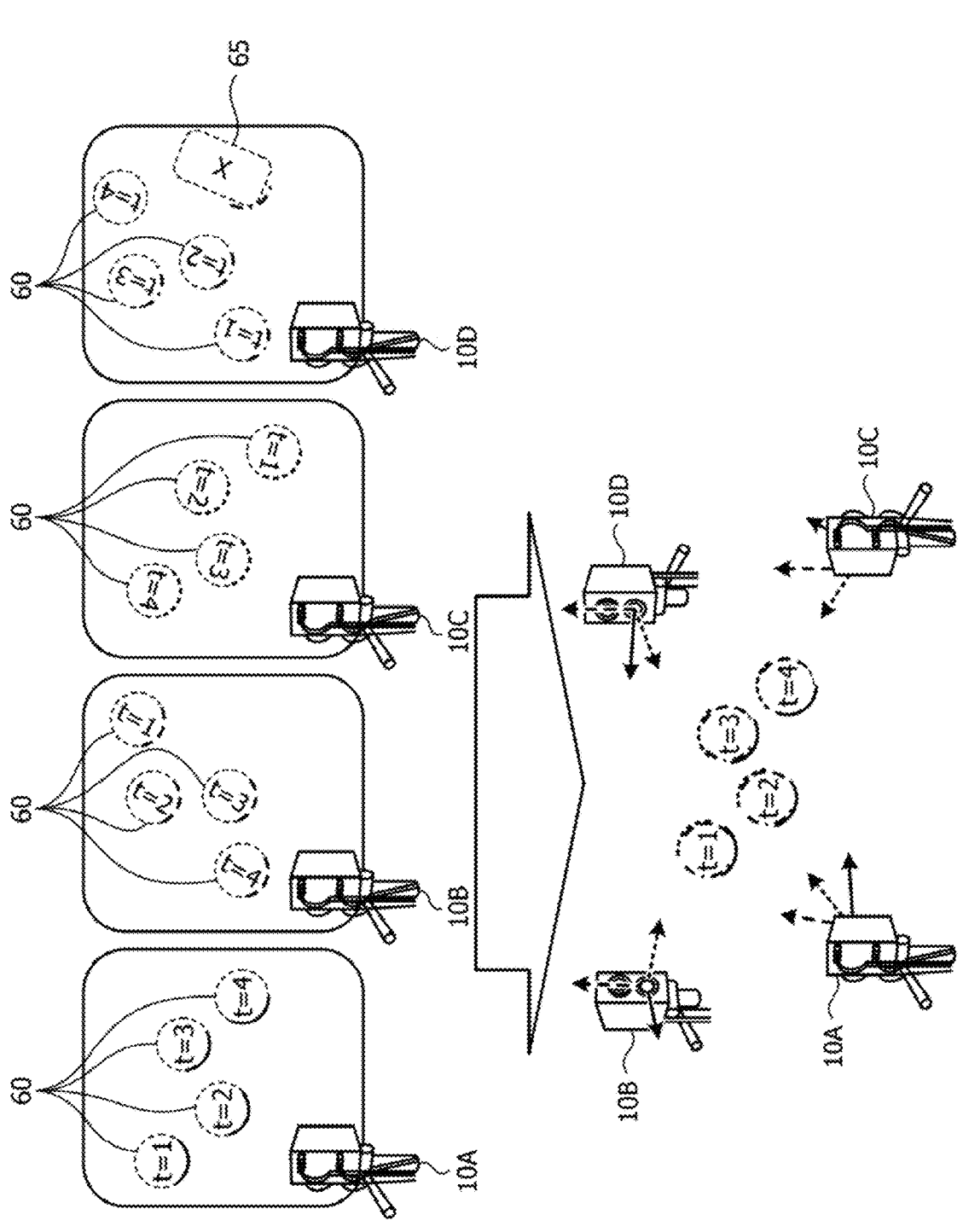
FIG. 20 is a diagram (3) illustrating an example of external calibration using a spherical marker.

FIGS. 18 to 20 are diagrams illustrating an example of external calibration using a spherical marker. As illustrated in FIG. 18, the user (not illustrated) observes the spherical marker 60 by the sensors 10A to 10D while moving the spherical marker 60 at each time point. The spherical marker 60 is moved by a user (not illustrated).

The sensor 10A observes an observation result 61A at each time point. The sensor 10B observes an observation result 61B at each time point. The sensor 10C observes an observation result 61C at each time point. The sensor 10D observes an observation result 61D at each time point.

The description proceeds to FIG. 19. Here, the distance image data included in the observation result will be used for description. The information processing apparatus 100 generates a background difference data 63 by taking the difference between distance image data 62 and the background image data. The information processing apparatus 100 generates background difference data 64 by removing noise from background difference data 63. The information processing apparatus 100 detects a spherical marker 64*a* from the background difference data 64. For example, the information processing apparatus 100 can robustly detect the spherical marker 64*a* with respect to the measurement noise by fitting the spherical marker 64*a*.

The description proceeds to FIG. 20. The information processing apparatus 100 repeatedly executes the above processing at time t=1 to 4, and identifies the spherical marker 60 at each time points t=1 to 4 observed by each sensor 10. For example, the sensor 10A observes the spherical marker 60 at each time points t=1 to 4. The sensor 10B observes the spherical marker 60 at each time points t=1 to 4. The sensor 10C observes the spherical marker 60 at each time points t=1 to 4. The sensor 10D observes the spherical marker 60 at each time points t=1 to 3, and erroneously detects noise 65 at time t=4.

Here, it is assumed that the noise 65 is removed by the robust estimation unit 164 at time t=4, and the spherical marker 60 is detected by the sensor 10D at time t=4. The information processing apparatus 100 generates the sensor connectivity graph on the basis of the share number of the spherical marker 60 and the variance of the spherical markers 60, and generates the external parameters.

As described above, the information processing apparatus 100 may accurately generate information (external parameters) indicating relative positional relationships such as an arrangement positional relationship and an angle of view relationship, even using the spherical marker 60 instead of the target 2.

Embodiment 2

Next, an information processing system according to the present embodiment 2 will be described. The information processing system according to the present embodiment 2 arranges a target at a predetermined position and measures the target, thereby calculating position and orientation of an object other than sensors in addition to generating external parameters. In the present embodiment 2, as an example, description will be given using gymnastic equipment as the object other than sensors, but the present embodiment is not limited to the example.

Figure 21:
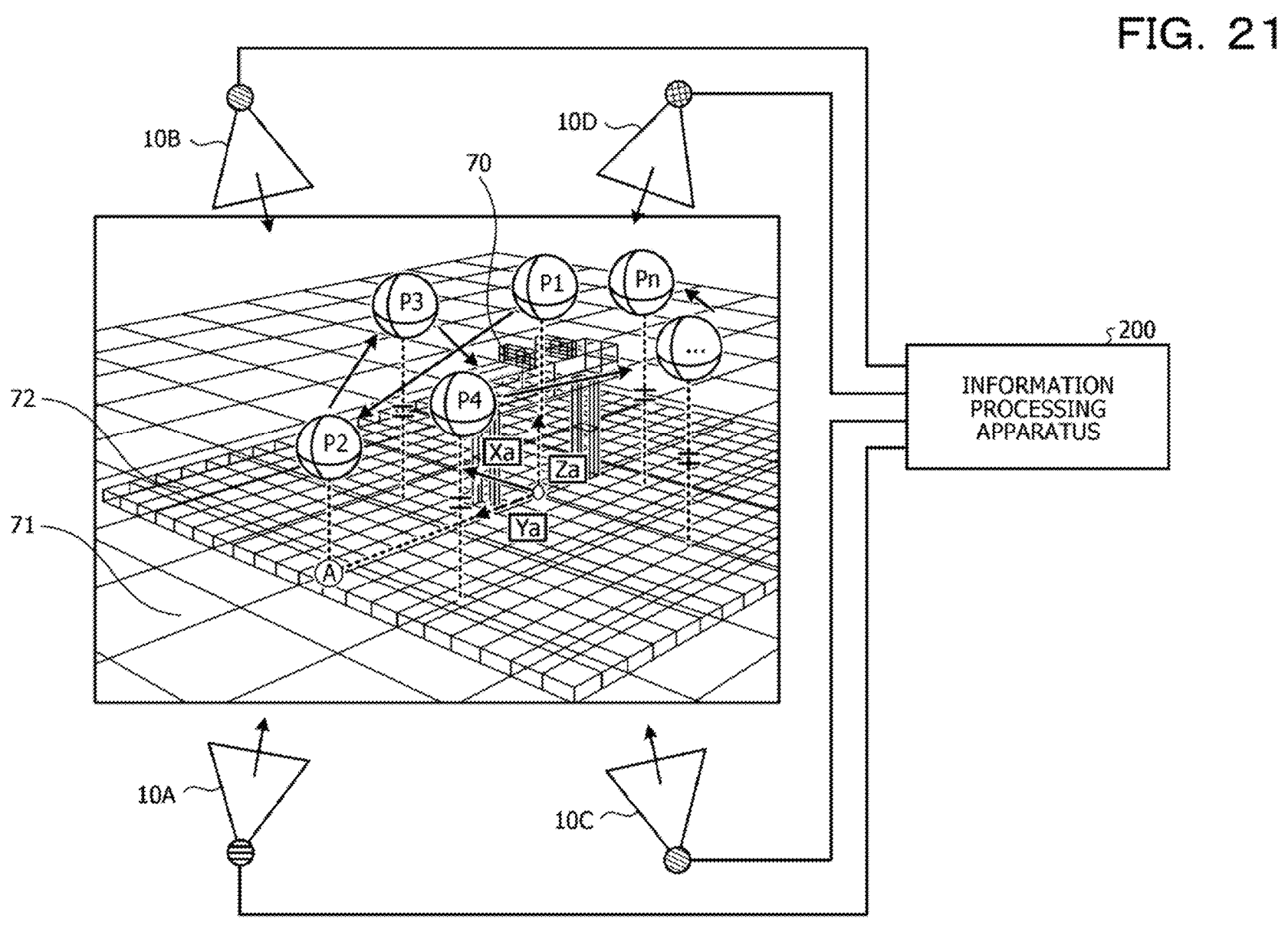

FIG. 21 is a diagram for describing an arrangement position of a target. As illustrated in FIG. 21, gymnastic equipment 70 is arranged. Furthermore, sensors 10A to 10D are arranged around the gymnastic equipment 70. Each of the sensors 10A to 10D is connected to the information processing apparatus 200.

In FIG. 21, a target Pn means an arranged target at time point t=n. Target P1 is arranged directly above the center of gymnastic equipment 70. Target P2 is arranged on a y axis of the gymnastic equipment 70 and at a height H of an upper surface of the gymnastic equipment 70. Targets P3 to Pn are arranged at positions higher than P2 on a mat 72 having the same height from a floor surface 71. The heights from the floor surface 71 to the targets P3 to Pn are the same. The number of targets P3 to Pn being 3 or more is a condition.

The information processing apparatus 200 calculates an Xa axis, a Ya axis, a Za axis, and an origin Oa of a coordinate system of the gymnastic equipment 70, using the positions of the targets P1 to Pn observed during execution of external calibration after the execution of external calibration, similarly to the information processing apparatus 100 of the embodiment 1.

The information processing apparatus 200 fits a plane to the targets P3 to Pn, and specifies a normal of the plane as the Za axis.

The information processing apparatus 200 calculates the Xa axis on the basis of the equations (3) and (4). P1 and P2 included in the equation (3) indicate the positions of the targets P1 and P2.

$$v=(P2-P1)/|P2-P1| \qquad (3)$$

$$Xa=(v/|v|)\times Za \qquad (4)$$

The information processing apparatus 200 calculates the Ya axis on the basis of the equation (5).

$$Ya=Za\times Xa \qquad (5)$$

The information processing apparatus 200 calculates the origin Oa on the basis of the equation (6). H included in the equation (6) corresponds to the height of the upper surface of the gymnastic equipment 70. dot (v, Za) included in equation (6) is a function that calculates an inner product of v and Za.

$$Oa=P1-(H-\text{dot}(v,\ Za))Za \qquad (6)$$

A reference sensor is set to the sensor 10A, and a coordinate conversion parameter $T_{aA}$ that converts the Xa axis, Ya axis, Za axis, and origin Oa into coordinates with reference to the sensor 10A is calculated. The coordinate conversion parameter $T_{aA}$ includes a rotation component R and a translational component t. The rotation component R is defined by the equation (7). The translational component t is defined by the equation (8). For example, by multiplying three-dimensional coordinates obtained from an observation result of the sensor 10A by the coordinate conversion parameter $T_{aA}$, the coordinate system with reference to the sensor 10A can be converted into the coordinate system of the gymnastic equipment 70.

$$R=[Xa\ Ya\ Za]^T \qquad (7)$$

$$t=R\times Oa \qquad (8)$$

As described above, the information processing apparatus 200 according to the present embodiment 2 can calculate the Xa, Ya, Za, and origin Oa of the coordinate system of the gymnastic equipment 70 other than the sensors, in addition to generation of the external parameters, by arranging the target Pn at a predetermined position and measuring the target Pn. For example, in the case of generating a three-dimensional model of an object and displaying the model as an animation, the three-dimensional model can be displayed as an animation using the coordinate system of the gymnastic equipment 70.

Figure 22:
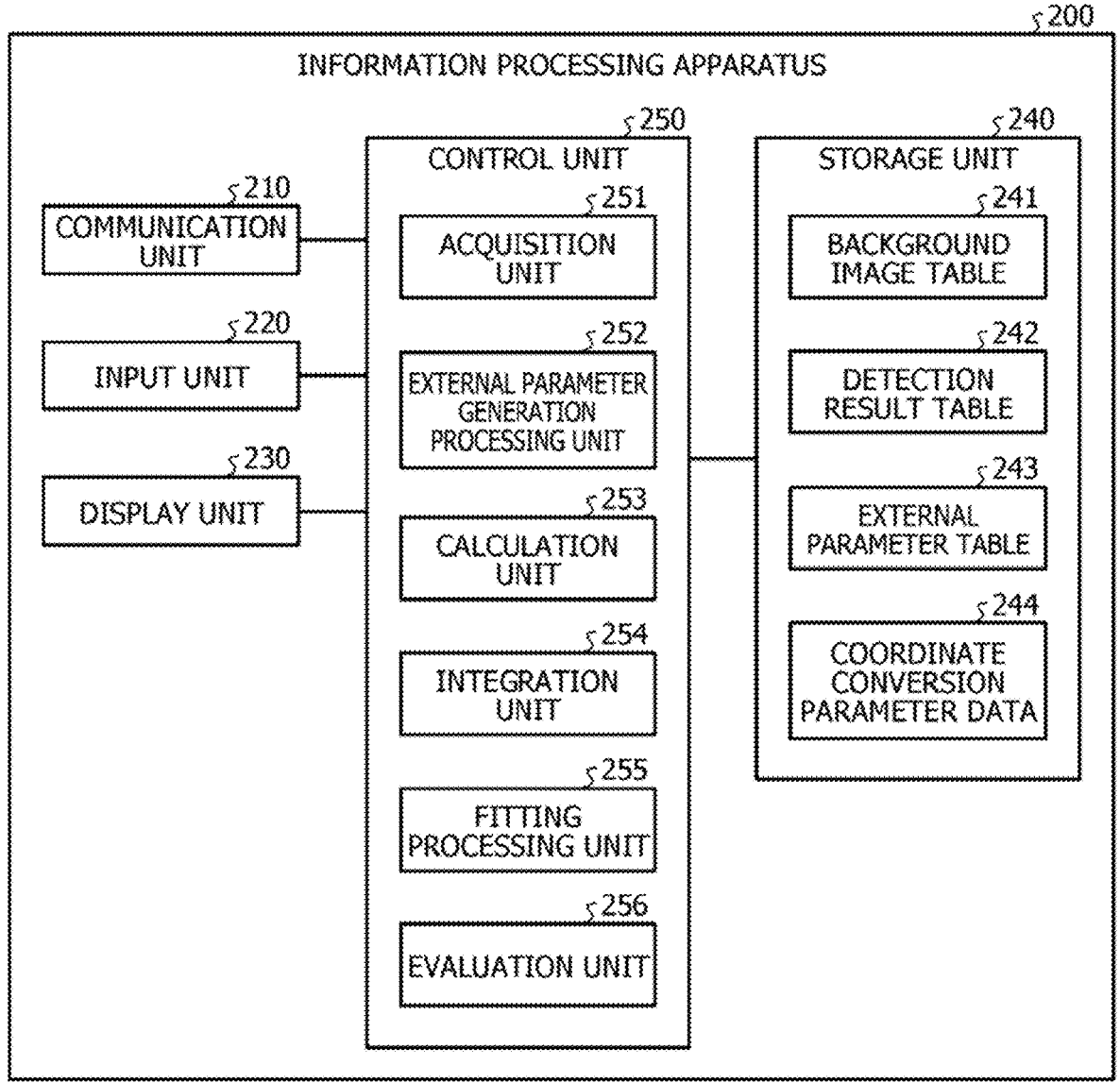
FIG. 22 is a functional block diagram illustrating a configuration of an information processing apparatus according to the present embodiment 2.

Next, one example of a configuration of the information processing apparatus 200 according to the present embodiment 2 will be described. FIG. 22 is a functional block diagram illustrating a configuration of the information processing apparatus according to the present embodiment 2. As illustrated in FIG. 22, the information processing apparatus 200 includes a communication unit 210, an input unit 220, a display unit 230, a storage unit 240, and a control unit 250.

The communication unit 210 is a processing unit that receives distance image data from the sensor 10 illustrated in FIG. 21. The communication unit 210 outputs the received distance image data to the control unit 250. The communication unit 210 is an example of a communication device.

The input unit 220 is an input device that inputs various types of information to the information processing apparatus 200. The input unit 220 corresponds to a keyboard, a mouse, a touch panel, or the like. For example, the user operates the input unit 220 to input information indicating that installation of the target Pn has been completed to the information processing apparatus 200 each time the installation of the target Pn has been completed at each time point.

The display unit 230 is a display device that displays information output from the control unit 250. For example, the display unit 230 displays skill certification, scoring results, and the like of various competitions. The display unit 230 corresponds to a liquid crystal display, an organic electro-luminescence (EL) display, a touch panel, or the like.

The storage unit 240 has a background image table 241, a detection result table 242, an external parameter table 243, and coordinate conversion parameter data 244. The storage unit 240 corresponds to a semiconductor memory element such as a RAM or a flash memory, or a storage device such as an HDD.

The background image table 241 is a table that stores background image data (distance image data) measured by each of the sensors 10A to 10D in the state of absence of the target Pn.

The detection result table 242 is a table that stores the point cloud and the position of the target Pn detected at each time point on the basis of the observation result of the sensor 10. The data structure of the detection result table 242 corresponds to the data structure of the detection result table 142 described with reference to FIG. 8. Note that the target will be the target Pn instead of the target 2.

The external parameter table 243 is a table that stores the external parameters generated by the external parameter generation processing unit 252, which will be described below. The data structure of the external parameter table 243 corresponds to the external parameter table 143 described with reference to FIG. 9.

The coordinate conversion parameter data 244 has data of the coordinate conversion parameter $T_{aA}$. The coordinate conversion parameter $T_{aA}$ is a parameter that converts the Xa axis, Ya axis, Za axis, and origin Oa into coordinates with reference to the sensor 10A.

The control unit 250 includes an acquisition unit 251, an external parameter generation processing unit 252, a calculation unit 253, an integration unit 254, a fitting processing unit 255, and an evaluation unit 256. The control unit 250 is implemented by CPU, MPU, a hard-wired logic such as ASIC or FPGA, or the like.

The acquisition unit 251 is a processing unit that acquires the distance image data from the sensor 10 via the communication unit 210. For example, timing at which the acquisition unit 251 acquires the distance image data is instructed by the user who operates the input unit 220. The acquisition unit 251 takes a difference between the distance image data and the background image data stored in the background image table 241, and generates background difference image data. The acquisition unit 251 outputs the background difference image data to the external parameter generation processing unit 252. Other descriptions regarding the acquisition unit 251 are similar to the descriptions regarding the acquisition unit 151 described in the embodiment 1.

The external parameter generation processing unit 252 is a processing unit that generates external parameters on the basis of data stored in the detection result table 242. The external parameter generation processing unit 252 stores the generated external parameters in the external parameter table 243. Description of the external parameter generation processing unit 252 is similar to the description of the external parameter generation processing unit 252 described in the embodiment 1.

The calculation unit 253 is a processing unit that calculates the Xa axis, Ya axis, Za axis, and origin Oa of the coordinate system of the gymnastic equipment 70. For example, the calculation unit 253 uses the sensor 10A as the reference sensor 10 and adjusts the three-dimensional point cloud data of the targets P1 to Pn observed by the sensors 10B to 10D to the position and orientation of the sensor 10A. The three-dimensional point cloud data of the targets P1 to Pn observed by the sensors 10B to 10D are stored in the detection result table 242.

For example, the calculation unit 253 uses an external parameter $T_{BA}$ to adjust the three-dimensional point cloud data observed by the sensor 10B to the position and orientation of the sensor 10A. The calculation unit 253 uses an external parameter $T_{CA}$ to adjust the three-dimensional point cloud data observed by the sensor 10C to the position and orientation of the sensor 10A. The calculation unit 253 uses an external parameter $T_{DA}$ to adjust the three-dimensional point cloud data observed by the sensor 10D to the position and orientation of the sensor 10A. The calculation unit 253 acquires each external parameter from the external parameter table 243.

The calculation unit 253 adjusts the three-dimensional point cloud data of the targets P1 to Pn observed by the sensors 10B to 10D to the position and orientation of the sensor 10A, and then integrates the three-dimensional point cloud data of the targets P1 to Pn observed by the sensors 10A to 10D. By executing the processing, the calculation unit 253 specifies the positions and shapes of the targets P1 to Pn at each time points t=1 to n illustrated in FIG. 21. For example, the calculation unit 253 sets the center of gravity position of the targets P1 to Pn as the position of the targets P1 to Pn.

The calculation unit 253 fits a plane to the targets P3 to Pn, and specifies the normal of the plane as the Za axis. The calculation unit 253 calculates the Xa axis on the basis of the equations (3) and (4). The calculation unit 253 calculates the Ya axis on the basis of the equation (5). The calculation unit 253 calculates the origin Oa on the basis of the equation (6). The calculation unit 253 calculates the coordinate conversion parameter $T_{aA}$ that converts the Xa axis, Ya axis, Za axis, and origin Oa into coordinates with reference to the sensor 10A on the basis of the equations (7) and (8). The calculation unit 253 stores the coordinate conversion parameter $T_{aA}$ in the storage unit 240.

Next, the description proceeds to the integration unit 254, the fitting processing unit 255, and the evaluation unit 256. The integration unit 254, the fitting processing unit 255, and the evaluation unit 256 execute processing when the external calibration is completed by the external parameter generation processing unit 252 and the object starts performance.

The integration unit 254 is a processing unit that integrates the three-dimensional point cloud data of the sensor 10A and the three-dimensional point cloud data of the sensors 10B to 10D adjusted to the position and orientation of the sensor 10A to generate one three-dimensional point cloud data. Description of the integration unit 254 is similar to the description of the integration unit 153 described in the embodiment 1.

Note that, in the case of receiving an instruction to perform conversion into the coordinate system of the gymnastic equipment 70 from the evaluation unit 256, the integration unit 254 multiplies the coordinates of the integrated three-dimensional point cloud data by the coordinate conversion parameter $T_{aA}$. Thereby, the three-dimensional point cloud data of the coordinate system with reference to the sensor 10A can be converted into the three-dimensional point cloud data of the coordinate system of the gymnastic equipment 70.

The fitting processing unit 255 is a processing unit that executes fitting that applies a three-dimensional model data of the object to the three-dimensional point cloud data. The fitting processing unit 255 specifies skeleton model data of the object on the basis of the fitting result. The skeleton model data includes position information of each joint. The fitting processing unit outputs the skeleton model data to the evaluation unit 256. The fitting processing unit 255 repeatedly executes the above processing every time the three-dimensional point cloud data is acquired from the integration unit 254.

The evaluation unit 256 is a processing unit that acquires the skeleton model data in time series and evaluates the performance of the object on the basis of transition of each joint coordinate of the skeleton model data. For example, the evaluation unit 256 evaluates the performance of the object using a table (not illustrated) that defines the transition of each joint coordinate, a type of technique, and success or failure of technique, and outputs the evaluation result to the display unit 230.

Furthermore, in the case of generating the three-dimensional model of the object and displaying the model as an animation using the time-series skeleton model data, the evaluation unit 256 may also display the three-dimensional model in an animation, using the coordinate system of the gymnastic equipment 70. Furthermore, the evaluation unit 256 may output the instruction to perform conversion into the coordinate system of the gymnastic equipment 70 to the integration unit 254, and may also convert the coordinates of the object into the coordinate system of the gymnastic equipment 70 and display the object.

Figure 23B:
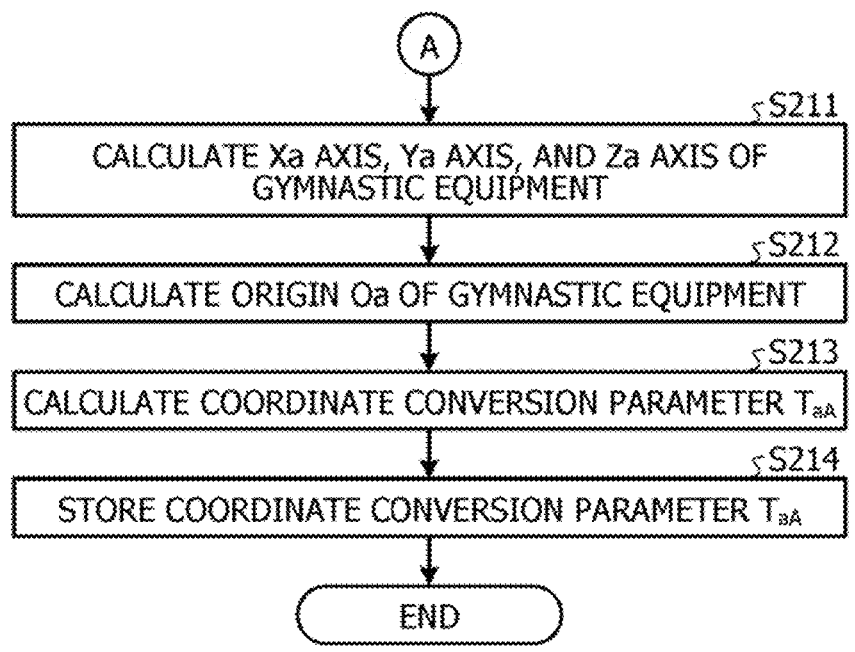

Next, an example of a processing procedure of the information processing apparatus 200 according to the present embodiment 2 will be described. FIG. 23 (i.e., FIGS. 23A and 23B) is a flowchart illustrating a processing procedure of the information processing apparatus according to the present embodiment 2. As illustrated in FIG. 23, the acquisition unit 251 of the information processing apparatus 200 acquires distance image data from the sensor 10 (step S201). The acquisition unit 251 takes a difference between the distance image data and the background image data and generates background difference data (step S202).

The external parameter generation processing unit 252 of the information processing apparatus 200 detects the target from the background difference data, and registers the point cloud information of the target in the detection result table 242 (step S203). In the case of not terminating the target detection (steps S204, No), the information processing apparatus 200 proceeds to step S201 again. On the other hand, in the case of terminating the target detection (steps S204, Yes), the information processing apparatus 200 proceeds to step S205.

The external parameter generation processing unit 252 of the information processing apparatus 200 executes the sensor connectivity graph generation processing (step S205). The sensor connectivity graph generation processing in step S205 corresponds to the processing procedure of the sensor connectivity graph generation processing described with reference to FIG. 17 of the embodiment 1.

The external parameter generation processing unit 252 of the information processing apparatus 200 applies the Bellman-Ford method to a sensor connectivity graph 31 for a set $(i_{ref}, i_{tar})$ of a reference sensor $i_{ref}$ and another sensor $i_{tar}$ to obtain the shortest path (step S206). For example, the reference sensor $i_{ref}$ corresponds to the sensor 10A. The another sensor $i_{tar}$ corresponds to the sensor 10B, 10C, or 10D.

The external parameter generation processing unit 252 selects the path P of the sensor group on the basis of the search result of the shortest path (step S207). The external parameter generation processing unit 252 calculates the initial value of the external parameter of the sensor $i_{tar}$ using the singular value decomposition on the basis of the order of the path P (step S208).

The external parameter generation processing unit 252 optimizes the external parameter of the sensor $i_{tar}$ by bundle adjustment and maximum likelihood estimation (step S209).

The external parameter generation processing unit 252 stores the external parameters in the external parameter table 243 (step S210).

The calculation unit 253 of the information processing apparatus 200 calculates the Xa axis, Ya axis, and Za axis of the gymnastic equipment 70 (step S211). The calculation unit 253 calculates the origin Oa of the gymnastic equipment 70 (step S212). The calculation unit 253 calculates the coordinate conversion parameter $T_{aA}$ (step S213). The calculation unit 253 stores the coordinate conversion parameter $T_{aA}$ in the coordinate conversion parameter data 244 (step S214).

Next, effects of the information processing apparatus 200 according to the present embodiment 2 will be described. The information processing apparatus 200 can calculate the Xa axis, the Ya axis, the Za axis, and the origin Oa of the coordinate system of the gymnastic equipment 70, using the positions of the targets P1 to Pn observed during execution of external calibration after the execution of external calibration. For example, by using the coordinate conversion parameter $T_{aA}$, in the case of generating the three-dimensional model of the object and displaying the model as an animation, the three-dimensional model can be displayed as an animation using the coordinate system of the gymnastic equipment 70.

Figure 24:
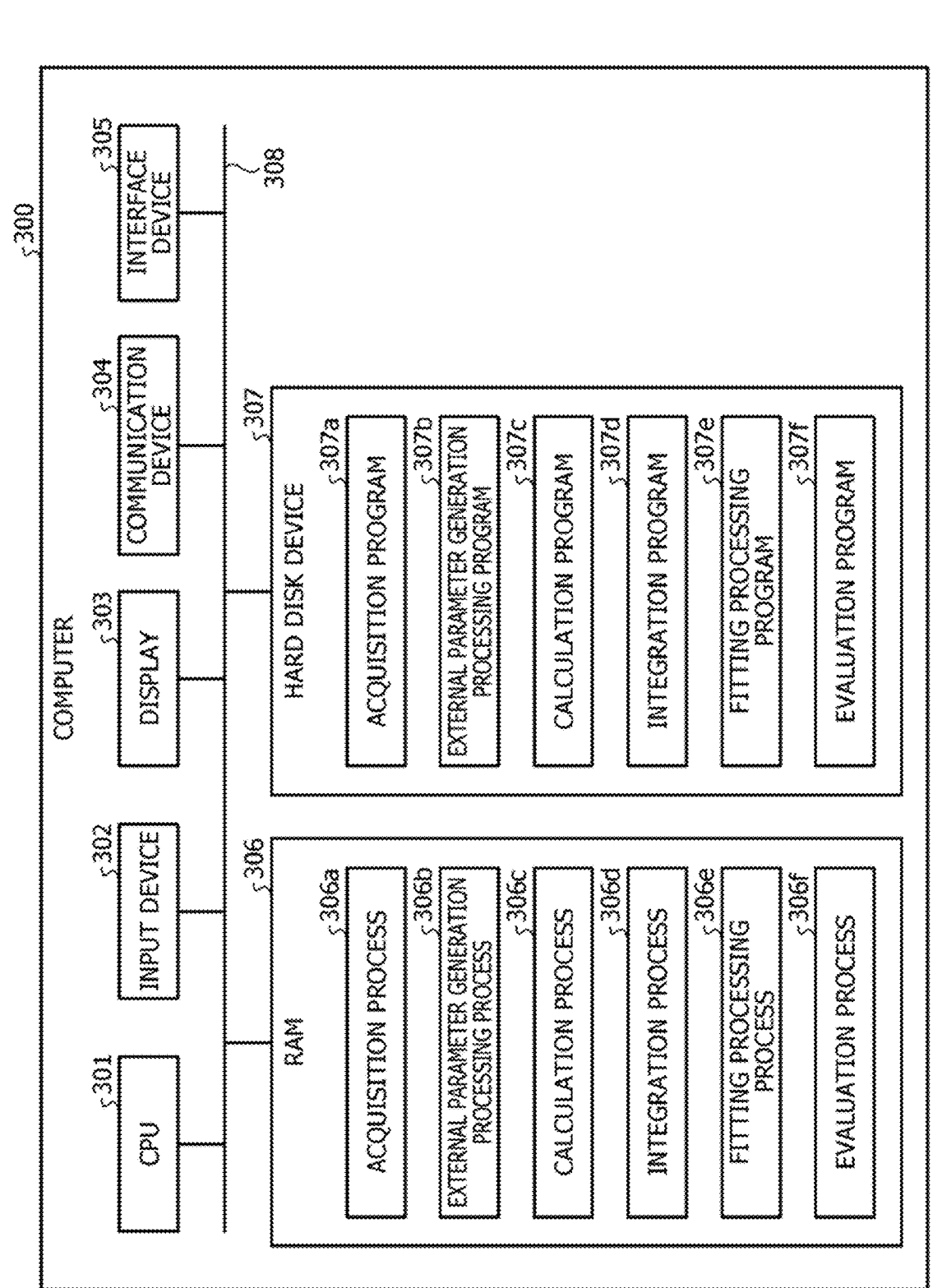
FIG. 24 is a diagram illustrating an exemplary hardware configuration of a computer that implements functions similar to those of the information processing apparatus.

Next, an exemplary hardware configuration of a computer that implements functions similar to those of the information processing apparatus 100 (200) described in the embodiments described above will be described. FIG. 24 is a diagram illustrating an example of a hardware configuration of a computer that implements functions similar to the information processing apparatus.

As illustrated in FIG. 24, a computer 300 includes a CPU 301 that executes various types of calculation processing, an input device 302 that receives input of data from a user, and a display 303. Furthermore, the computer 300 includes a communication device 304 that receives the distance image data from the sensor 10 and an interface device 305 connected to various devices. The computer 300 includes a RAM 306 that temporarily stores various types of information, and a hard disk device 307. Then, each of the devices 301 to 307 is connected to a bus 308.

The hard disk device 307 includes an acquisition program 307a, an external parameter generation processing program 307b, a calculation program 307c, an integration program 307d, a fitting processing program 307e, and an evaluation program 307f. The CPU 201 reads the acquisition program 307a, the external parameter generation processing program 307b, the calculation program 307c, the integration program 307d, the fitting processing program 307e, and the evaluation program 307f and expands the read programs to the RAM 306.

The acquisition program 307a functions as an acquisition process 306a. The external parameter generation processing program 307b functions as an external parameter generation processing process 306b. The calculation program 307c functions as a calculation process 306c. The integration program 307d functions as an integration process 306d. The fitting processing program 307e functions as a fitting processing process 306e. The evaluation program 307f functions as an evaluation process 306f.

The processing of the acquisition process 306a corresponds to the processing of the acquisition unit 151 or 251. The processing of the external parameter generation processing process 306b corresponds to the processing of the external parameter generation processing unit 152 or 252. The processing of the calculation process 306c corresponds to the processing of the calculation unit 253. The processing of the integration process 306d corresponds to the processing of the integration unit 153 or 254. The processing of the fitting processing process 306e corresponds to the processing of the fitting processing unit 154 or 255. The processing of the evaluation process 306f corresponds to the processing of the evaluation unit 155 or 256.

Note that each of the programs 307a to 307f may not necessarily be stored in the hard disk device 307 beforehand. For example, each of the programs is stored in a "portable physical medium" such as a flexible disk (FD), a compact disc read only memory (CD-ROM), a digital versatile disc (DVD) disk, a magneto-optical disk, or an integrated circuit (IC) card to be inserted in the computer 300. Then, the computer 300 may also read and execute each of the programs 307a to 307f.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A computer-implemented generation method of generating a sensor selection order in extrinsic calibration of a multi-sensor system that detects a target using a three or more sensors, the computer-implemented generation method comprising:

obtaining detection results of the target at a plurality of time points by the three or more sensors, each sensor of the three or more sensors being configured to measure a distance between the target and each sensor and output a three-dimensional point cloud including at least a point corresponding to the measured distance;

specifying a share number indicating a number of times of a time point when the target is detected at a same time point among the plurality of time points by each set of two sensors among the three or more sensors on a basis of whether each of the three or more sensors has detected the target at each time point;

generating a target share number graph including three or more nodes and edges, wherein each node of the three or more nodes represents a corresponding sensor of the three or more sensors, each edge of the edges represents connectivity between any two of the three or more nodes, and the specified share number is set as a weight of a corresponding one of the edges;

generating a sensor connectivity graph obtained by leaving the edge having the weight that is a predetermined number or more from the target share number graph, wherein a set of two nodes connected in the sensor connectivity graph indicates a set of two sensors in which the number of times the target is observed at the same time point is the predetermined number or more, and calculating a variance $\sigma$ of positions of the target at the plurality of time points observed by the set of two sensors at time points, reflecting the variance $\sigma$ of the target as a sensor in the sensor connectivity graph by setting a logarithmic function of the variance $\sigma$ as the weight of each edge;

specifying a path that minimizes a sum of the edges; and specifying, on the basis of the specified path, an order of sensors to be selected when calculating external parameters;

wherein the order of the sensors in which the variance σ of the positions of the target becomes as large as possible is specified so that the calculation of the external parameters of the sensors becomes stable.

2. The computer-implemented generation method according to claim 1, wherein a shape of the target is a sphere, and the computer-implemented generation method further comprises: detecting the sphere included in the detection results as the target.

3. The computer-implemented generation method according to claim 1, further comprising:

repeatedly executing the processing including:

setting, for each set of two sensors, a plurality of sets of targets in which targets detected at the same time point among the plurality of time points are associated with each other, selecting some sets of targets from the plurality of sets of targets, and calculating position and orientation of sensors that have a shortest distance between positions of the targets in the selected some sets of targets, while changing the set of targets to be selected; and further executing the processing of excluding one of the targets detected at the plurality of time points on a basis of a minimum value of distance between the positions of the targets.

4. The computer-implemented generation method according to claim 1, wherein the target is arranged at a predetermined position with respect to an object other than the three or more sensors at the plurality of time points, and the computer-implemented generation method further comprises: calculating origin coordinates of a coordinate system with reference to the object on a basis of positions of the target detected at the plurality of time points by one of the three or more sensors.

5. A non-transitory computer-readable storage medium storing a generation program of generating a sensor selection order in extrinsic calibration of a multi-sensor system that detects a target using a three or more sensors, the generation program comprising instructions which, when the generation program is executed by a computer, cause the computer to perform processing including:

obtaining detection results of the target at a plurality of time points by the three or more sensors, each sensor of the three or more sensors being configured to measure a distance between the target and each sensor and output a three-dimensional point cloud including at least a point corresponding to the measured distance;

specifying a share number indicating a number of times of a time point when the target is detected at a same time point among the plurality of time points by each set of two sensors among the three or more sensors on a basis of whether each of the three or more sensors has detected the target at each time point;

generating a target share number graph including three or more nodes and edges, wherein each node of the three or more nodes represents a corresponding sensor of the three or more sensors, each edge of the edges represents connectivity between any two nodes of the three or more nodes, and the specified share number is set as a weight of a corresponding one of the edges;

generating a sensor connectivity graph obtained by leaving the edge having the weight that is a predetermined number or more from the target share number graph, wherein a set of two nodes connected in the sensor connectivity graph indicates a set of two sensors in which the number of times the target is observed at the same time point is the predetermined number or more the same time point is a predetermined number or more, and calculating a variance σ of positions of the target at the plurality of time points observed by the set of two sensors at time points, reflecting the variance σ of the target as a sensor in the sensor connectivity graph by setting a logarithmic function of the variance σ as the weight of each edge;

specifying a path that minimizes a sum of the edges; and specifying, on the basis of the specified path, an order of sensors to be selected when calculating external parameters;

wherein the order of the sensors in which the variance σ of the positions of the target becomes as large as possible is specified so that the calculation of the external parameters of the sensors becomes stable.

6. The non-transitory computer-readable storage medium according to claim 5, wherein a shape of the target is a sphere, and the processing further includes: detecting the sphere included in the detection results as the target.

7. The non-transitory computer-readable storage medium according to claim 5, the processing further including:

repeatedly executing the processing including:

setting, for each set of two sensors, a plurality of sets of targets in which targets detected at the same time point among the plurality of time points are associated with each other, selecting some sets of targets from the plurality of sets of targets, and calculating position and orientation of sensors that have a shortest distance between positions of the targets in the selected some sets of targets, while changing the set of targets to be selected; and further executing the processing of excluding one of the targets detected at the plurality of time points on a basis of a minimum value of distance between the positions of the targets.

8. The non-transitory computer-readable storage medium according to claim 5, wherein the target is arranged at a predetermined position with respect to an object other than the three or more sensors at the plurality of time points, and the processing further includes: calculating origin coordinates of a coordinate system with reference to the object on a basis of positions of the target detected at the plurality of time points by one of the three or more sensors.

9. An information processing apparatus of generating a sensor selection order in extrinsic calibration of a multi-sensor system that detects a target using a three or more sensors, the information processing apparatus comprising:

a memory; and a processor coupled to the memory, the processor being configured to perform processing including:

obtaining detection results of the target at a plurality of time points by three or more sensors, each sensor of the three or more sensors being configured to measure a distance between the target and each sensor and output a three-dimensional point cloud including at least a point corresponding to the measured distance;

specifying a share number indicating a number of times of a time point when the target is detected at a same time point among the plurality of time points by each set of two sensors among the three or more sensors on a basis of whether each of the three or more sensors has detected the target at each time point;

generating a target share number graph including three or more nodes and edges, wherein each node of the three or more nodes represents a corresponding sensor of the three or more sensors, each edge of the edges represents connectivity between any two of the three or more nodes, and the specified share number is set as a weight of a corresponding one of the edges;

generating a sensor connectivity graph obtained by leaving the edge having the weight that is a predetermined number or more from the target share number graph, wherein a set of two nodes connected in the sensor connectivity graph indicates a set of two sensors in which the number of times the target is observed at the same time point is the predetermined number or more, and calculating a variance o of positions of the target at the plurality of time points observed by the set of two sensors at time points, reflecting the variance $\sigma$ of the target as a sensor in the sensor connectivity graph by setting a logarithmic function of the variance $\sigma$ as the weight of each edge;

specifying a path that minimizes a sum of the edges; and specifying, on the basis of the specified path, an order of sensors to be selected when calculating external parameters;

wherein the order of the sensors in which the variance $\sigma$ of the positions of the target becomes as large as possible is specified so that the calculation of the external parameters of the sensors becomes stable.

10. The information processing apparatus according to claim 9, wherein a shape of the target is a sphere, and the processing further includes: detecting the sphere included in the detection results as the target.

11. The information processing apparatus according to claim 9, further comprising:

repeatedly executing the processing including:

setting, for each set of two sensors, a plurality of sets of targets in which targets detected at the same time point among the plurality of time points are associated with each other, selecting some sets of targets from the plurality of sets of targets, and calculating position and orientation of sensors that have a shortest distance between positions of the targets in the selected some sets of targets, while changing the set of targets to be selected; and further executing the processing of excluding one of the targets detected at the plurality of time points on a basis of a minimum value of distance between the positions of the targets.

12. The information processing apparatus according to claim 9, wherein the target is arranged at a predetermined position with respect to an object other than the three or more sensors at the plurality of time points, and the processing further includes: calculating origin coordinates of a coordinate system with reference to the object on a basis of positions of the target detected at the plurality of time points by one of the three or more sensors.

* * * * *